US010883759B2

(12) United States Patent
Beham et al.

(10) Patent No.: US 10,883,759 B2
(45) Date of Patent: Jan. 5, 2021

(54) TRANSPORT CONTAINER WITH REMOTE SURVEILLANCE CAPABILITY

(71) Applicant: BASF SE, Ludwigshafen am Rhein (DE)

(72) Inventors: Frank Beham, Ludwigshafen (DE); Stefan Kolb, Ludwigshafen (DE); Philipp Johannes Boeckmann, Ludwigshafen (DE); Jan Kurt Walter Sandler, Heidelberg (DE); Marc Fricke, Lemfoerde (DE); Elsie Jamin-Maguire, Ludwigshafen (DE); Joerg Krogmann, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 89 days.

(21) Appl. No.: 16/089,149

(22) PCT Filed: Mar. 27, 2017

(86) PCT No.: PCT/EP2017/057214
§ 371 (c)(1),
(2) Date: Sep. 27, 2018

(87) PCT Pub. No.: WO2017/167697
PCT Pub. Date: Oct. 5, 2017

(65) Prior Publication Data
US 2020/0182538 A1 Jun. 11, 2020

(30) Foreign Application Priority Data

Mar. 29, 2016 (EP) .................................. 16162645
Aug. 26, 2016 (EP) .................................. 16186036
Mar. 12, 2017 (EP) .................................. 17160455

(51) Int. Cl.
F25D 29/00 (2006.01)
F25D 3/06 (2006.01)
(Continued)

(52) U.S. Cl.
CPC ............. F25D 29/003 (2013.01); F25D 3/06 (2013.01); H04Q 9/02 (2013.01); F25D 2201/14 (2013.01);
(Continued)

(58) Field of Classification Search
CPC ...... F25D 29/003; F25D 3/06; F25D 2201/14; H04Q 9/02; H04Q 2209/82; H04Q 2209/40; G06Q 10/0832
See application file for complete search history.

(56) References Cited

U.S. PATENT DOCUMENTS 6,325,281 B1 * 12/2001 Grogan .............. B65D 81/3862
220/592.25
2013/0106607 A1 5/2013 Clement et al.
(Continued)

FOREIGN PATENT DOCUMENTS

DE 101 59 518 A1 6/2003
DE 10 2004 050 549 A1 3/2006
(Continued)

OTHER PUBLICATIONS

International Search Report dated May 30, 2017, in PCT/EP2017/057214 filed Mar. 27, 2017.

Primary Examiner — James J Yang
(74) Attorney, Agent, or Firm — Oblon, McClelland, Maier & Neustadt, L.L.P.

(57) ABSTRACT

A transport container for transporting an object includes an object location to receive the object and a vacuum insulation panel (VIP) to thermally insulate the object location. A sensor unit in the VIP provides a panel condition signal that
(Continued)

corresponds to a measurement value of a physical property of the VIP. The physical property influences temperature of the object. A short-distance transmitter unit transmits a first coding of the PCS inside the Container, a long-distance transmitter unit transmits a second coding of the PCS to a remote server for processing the PCS. The server determines a representation of an operation state of the transport container, wherein the operation state is related to the temperature of the object. The material of the VIP is classified and differentiated so that transmitting parameters depend on the material.

18 Claims, 11 Drawing Sheets

(51) Int. Cl.
    *H04Q 9/02*     (2006.01)
    *G06Q 10/08*     (2012.01)

(52) U.S. Cl.
    CPC ..... *G06Q 10/0832* (2013.01); *H04Q 2209/40* (2013.01); *H04Q 2209/82* (2013.01)

(56) References Cited

U.S. PATENT DOCUMENTS

| | | |
|---|---|---|
| 2013/0201032 A1* | 8/2013 | Hewitt .................. G08C 17/02 340/870.02 |
| 2014/0180953 A1 | 6/2014 | Westcott et al. |
| 2015/0163569 A1 | 6/2015 | Hewitt et al. |
| 2015/0300887 A1 | 10/2015 | Mandava et al. |
| 2016/0217309 A1 | 7/2016 | Clement et al. |
| 2017/0320054 A1* | 11/2017 | Crum ...................... B01L 3/502 |

FOREIGN PATENT DOCUMENTS

| | | |
|---|---|---|
| DE | 10 2006 042 426 B4 | 9/2015 |
| WO | WO 2009/019251 A1 | 2/2009 |
| WO | WO 2013/116843 A1 | 8/2013 |
| WO | WO 2015/135656 A1 | 9/2015 |
| WO | WO 2016-046172 A2 | 3/2016 |

* cited by examiner

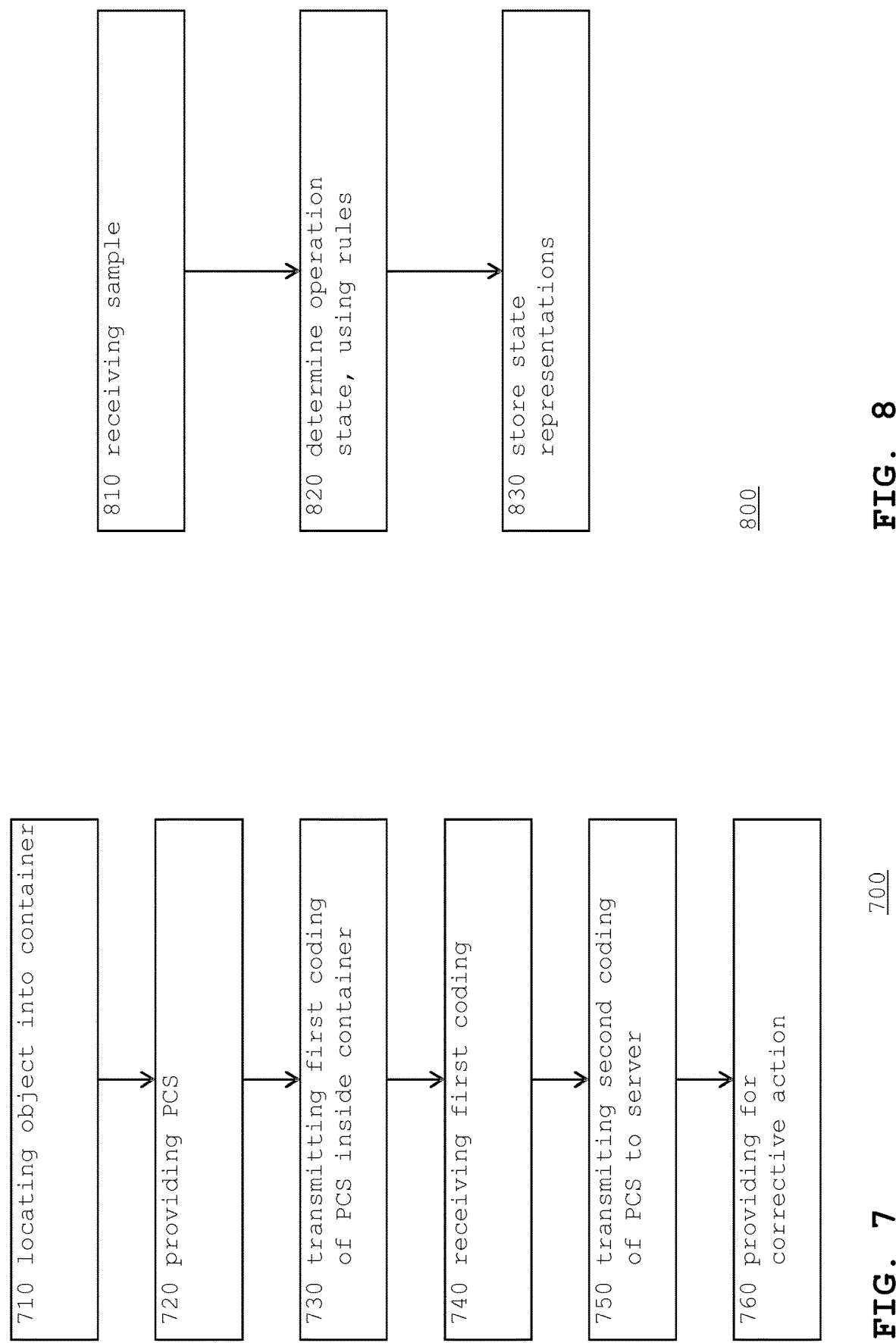

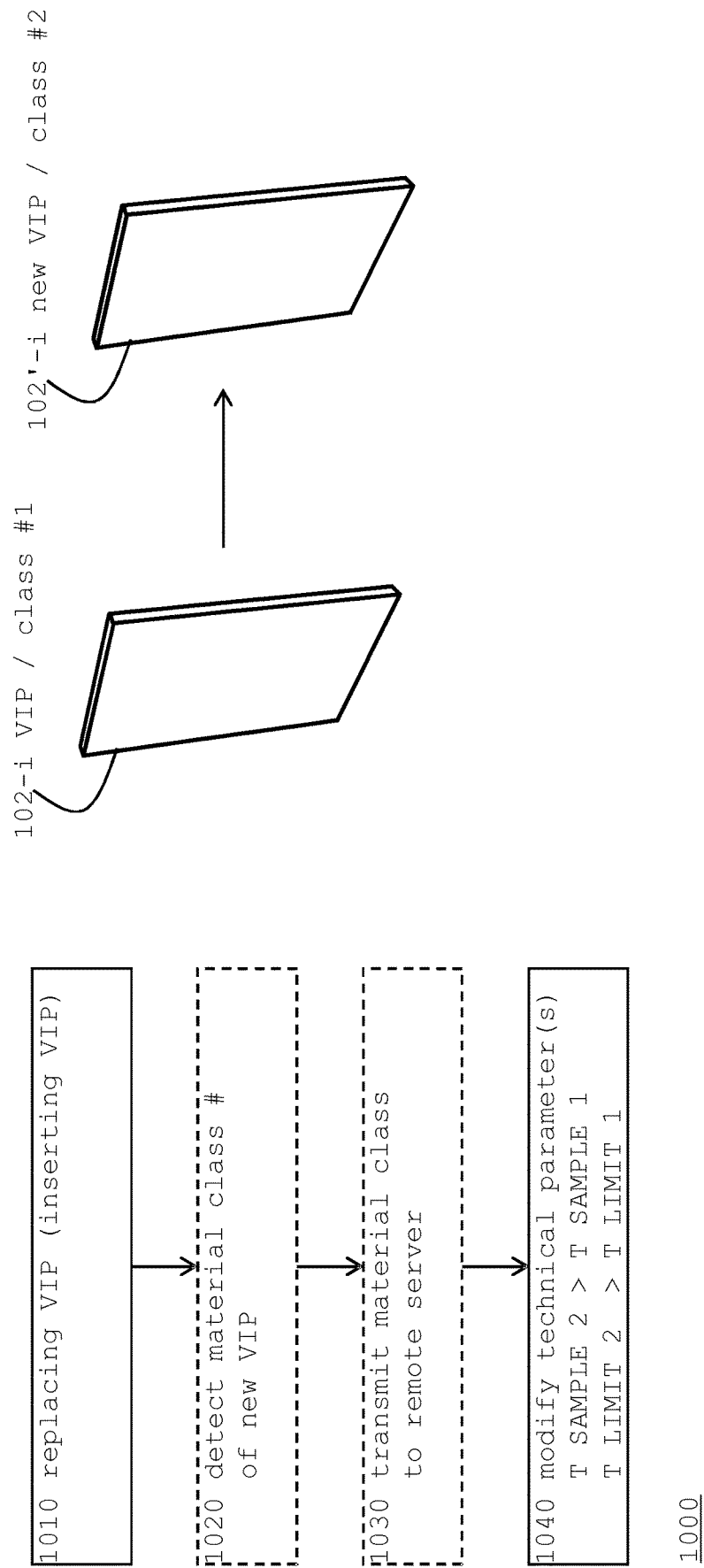

TRANSPORT CONTAINER WITH REMOTE SURVEILLANCE CAPABILITY

TECHNICAL FIELD

In general, the present invention relates to containers for transporting objects within given conditions, such as to containers for temperature-sensitive products. More in particular, it relates to transport containers for that the conditions are under remote surveillance or monitoring.

BACKGROUND

Transporting objects between geographic locations within object-specific time intervals is well-known in logistics. For efficiency reasons, transportation very often takes a multi-modal approach in a transport chain that uses a variety of vehicles, such as road or rail vehicles, ships, aircraft or even bicycles, and that uses a variety of intermediate storage facilities, such as warehouses. Well-established logistics systems are specialized to certain types of objects. The objects usually have functions to perform upon arriving at the destination. But substantially all elements of the chain—the vehicles and the storage facilities—also create a potential risk that the object loses its function. The risk is often related to environmental conditions during transport.

To accommodate such and other risks, the sender encloses the objects into object-specific containers. At the target destination, the recipient checks the status of the container to obtain an indication if the object has maintained its function or not. This status check can include looking at certain environmental conditions during transport. The container can have auxiliary devices to assist the recipient to perform this check.

In a well-known example, the mail system is a logistics system to transport letters or other objects. The letters are enclosed into envelopes that protect against typical risks such as the exposure to unauthorised readers, dirt, or moisture. When at the end of the chain, the postman hands over the letter to the recipient, the recipient visually inspects the envelope and determines, for example, if the letter was exposed to a non-authorized reader or not. Seals are traditionally used to assists here. Meta-information on the letter or on the envelope (date or time stamps) helps the recipient to check if the transport occurred within a typical time interval.

In a further example, pharmaceuticals have to be transported from the manufacturers (or from the distributors) to the drugstores. There is a risk that some pharmaceuticals lose the function due to extreme temperatures. If the temperature during transport exceeds (or exceeded) a tolerance band, administration of the pharmaceuticals to patients is no longer possible. The containers can comprise temperature insulating materials, and the elements in the chain (e.g., vehicles and storage) can be adapted for that particular purpose.

However, in a more sophisticated example, the logistical requirements can be much more severe. The objects can be medicinal products that have to be transported from the manufacturer or distributor (at location A, or initial location) to a particular hospital (at location B, or target location) for administration to a particular patient. Trips around the globe, or for example, from A in Europe to B in Asia are common. Frequently, such products are customized for the particular patient and therefore not packed into commodities such as pills or the like. For this and other reasons, the substances can be extremely sensitive to environmental conditions such as extreme high or extreme low temperatures.

Logistical requirements can be derived by taking the environmental conditions into account. The requirements are technical requirements. Such technical requirements are usually summarized in standard documents, in specifications for temperature guided logistics or in other documents. For example, an overview is available in the "Guidelines of 5 Nov. 2013 on Good Distribution Practice of medicinal products for human use" (2013/C 343/01 Official Journal of the European Union, dated 23. November 2013).

For example, in temperature controlled logistics, the temperature conditions are to be maintained within acceptable limits during transport. For example, there is a requirement that the object (e.g., product, substance) remains below a maximum temperature ($\theta$ MAX, upper limit) and above a minimum temperature ($\theta$ MIN, lower limit) all the time during transport. For example, the object temperature needs to be in min/max ranges between $-25°$ C. and $-15°$ C., between $+2°$ C. and $+8°$ C., or between $+15°$ C. and $+25°$ C. Other temperature ranges are also possible. In logistics, requirements are sometimes summarized under terms such as "cold chain", "temperature controlled logistics", or the like.

Frequently, the object temperature is below the environment temperature of the container. Cooling the object is therefore required.

The containers can be boxes that have thermally-insulated walls. The thermally-insulated walls can be made from vacuum insulation panels (VIP, vacuum-insulated plates or panels, etc.). The container can include sensors. Examples for containers and VIPs are explained in a number of documents, among them WO 2009/019251 A1 (with temperature measuring element), WO 2015/135656 A1, DE 10 2004 050 549 A1, and DE 101 59 518 A1 (with sensor to determine the air pressure inside the plate). To provide a measurement value, the sensors require physical contact with a reader device.

Composites, such as VIPs, find more and more use in thermal insulation. Due to lower thermal conductivity, VIPs have advantages over conventional insulation materials. Compared to predominantly closed-cell PUR rigid foam materials, the energy saving potential might be 3 to 7 times higher. In general, VIPs have a thermally insulating core material that is packed into a vacuum-proof enclosure. The enclosure is usually made of foil or film. The package is being evacuated and air-proof sealed. Usually, the vacuum is below 100 mbar. Parameters such a structure or porosity of the core are to be taken into account, but VIPs with a thermal conductivity of less than 10 mW/m*K can be reached.

The core might consist of plates made from fumed silica or glass fiber. It is also possible to use rigid foam or xerogels. Such materials have an intrinsic stability but also allow the adaptation of the form as needed. Besides frequently used polyurethane (PUR) foams or polyisocyanurate (PIR) foams, aerogels can be used as well. Aerogels show reliable thermal insulation even if evacuation is not applied. A method for manufacturing a composite element for vacuum insulation elements is explained in WO 2016/046172 A2 published Mar. 31, 2016.

The composite element should be mechanically stable, but the enclosure needs to be stable as well. Mechanical damages to the enclosure destroy the vacuum. As a result, the composite element loses mechanical stability—which is especially true for core materials made from glass fibres or fumed silica—and the thermal insulation becomes less efficient.

The so-called performance of the VIP is important. Simplified, a VIP without vacuum lets heat into the box (or lets heat out of the box) so that—after a while—the object temperature goes above the upper limit (or below the lower limit). In both cases, a deviation from the temperature destroys the function (of the object).

However, the sensors allow only a determination of the VIP performance after the transport container has arrived at the destination. This is a consequence from the above-mentioned physical contact. Measuring at a distance is not possible, and the measurement result is obtained ex post. Based on the determination, the object may eventually to be destroyed. At that point in time it might be too late to order a replacement product.

SUMMARY

Determining the performance of the VIP and checking the conditions of the container prior to arrival becomes possible. According to embodiments of the present invention, a transport container is not only equipped with VIPs and with sensors at the VIP, but also equipped with transmitter units to forward a panel condition signal (PCS) to a remote server computer. This allows continuous surveillance and monitoring of the conditions and of the VIP performance. The state of the container is determined remotely, and the remote server can keep a representation of the conditions and of the state substantially all of the time during transport. In other words, this approach enables real-time tracking of the VIP performance independent of the location of the container.

The transport container has an object location into which a temperature-sensitive object, such as a medicinal product, can be inserted. In other words, the object location is adapted to receive the object. The object location is thermally insulated by at least one VIP to the surroundings of the container. Physical properties of the VIP, such as the internal gas pressure, influence the temperature of the object. Property-to-temperature-relations can be determined and estimated in advance, by applying formulas in thermodynamics and/or by applying empirical data.

The property-to-temperature-relations can be simplified to the occurrence of events and to a time interval between the events. A first event—the VIP event—refers to a change of a physical property, such as the change of the air pressure inside the VIP. A second event—the object event—refers to a condition of the object location in that the temperature goes above or below a threshold.

The VIP event causes the object event. Multiple VIP events can occur in combination for one or for more VIPs, and the occurrence of multiple VIP events usually shortens the time interval between the events.

Depending on the occurrence of the events, the transport container has an operation state: The container is in FUNCTION until the object event, and the container is in FAILURE from the object event. The container is in PRE-FAILURE if at least one VIP event occurs or has occurred.

During transport, the physical properties of the VIP may change so that the events can occur. To support the detection of—at least—some VIP events, the transport container is equipped with devices that measure physical properties of the VIPs and that allow forwarding the PCS to the remote server computer.

The devices in the container comprise: sensor units that are embedded into the VIP to provide the PCS, a short-range transmitter unit at the VIP (or multiple units at multiple VIPs), and a long-distances transmitter unit at the container.

The remote server computer processes the PCS (from the VIP), determines a state of the transport container according to pre-defined rules in an ongoing process. The remote server computer stores representations of that state over time. The pre-defined rules are set up according to the above-mentioned property-to-temperature-relations.

More in detail, the sensor units provide the PCS that correspond to the measured physical properties. From the VIP, the short-range transmitter units forward the PCS in a first coding. In the container, the long-distance transmitter unit receives the PCS in the first coding from the VIP and transmits the PCS in a second coding to a communication network. The communication network forwards the PCS in the second coding to the remote server computer.

Such an approach can be advantageous for the persons and other entities involved in the transportation. Only a few examples are given:

(a) Setting up the pre-defined rules remains in the responsibility of the person that operates the remote computer, usually the sender of the object.

(b) If a transmission interval (PCS, from the long-distance transmitter to the remote server computer) is selected accordingly, determining the PRE-FAILURE state can trigger a corrective action. Such an action can include rescuing the object so that the object keeps its function through the end of the transport. For example, the carrier can shortly interrupt the transport and can replace a defective VIP. In other words, a broken VIP can be replaced before the container fails. Performance of the action can be limited to pre-defined locations, such as service points, in that certain conditions are complied with: the availability of a temperature-controlled and clean room, the possibility to condition or cool the container to lower temperatures, the availability of trained staff, etc. Hospitals or laboratories may qualify as such service points. In case that the action performed successfully, the recipient—including the patient—receives the medicinal product with minimal delay, or even without delay.

(c) Even if FAILURE is determined (for that the object has to be destroyed), the sender can ship a new container with a replacement object immediately. This is potentially lifesaving for the patient.

(d) Due to the separation of data collection and data processing (PCS measuring in the container and rule application in the remote server computer) in combination with a real-time transmission (between container and remote server computer), non-authorized attempts to modify the state determination are complicated.

Depending on the transmission interval—that is the time interval between subsequent transmissions of the PCS from the long-distance transmitter unit to the remote server computer—the transmission can be distinguished in two alternatives.

In the first alternative, the transmission interval substantially remains unchanged and has a predefined duration: the transmission is regarded as a periodic transmission. In the second alternative, the transmission interval is defined as the maximal duration between subsequent transmissions. The second alternative is regarded as a non-period transmission.

Further, it is noted that the concept of a passively cooled container remains unchanged. The performance check of the VIP (and of the container) is performed so that the VIP and the containers can be re-used for further transports.

Interaction with the persons involved can be enhanced. The sender of the container can become a computer user who inspects visual representations of the VIPs in a fleet of containers, even if he or she does not see the containers in reality. In this case, the representations are based on data from the remote server computer. The person working in logistics can be a user of a mobile device (e.g., a smartphone or the like); he or she can read state information and action recommendations from this mobile device and can physically take the action, including the above-mentioned corrective action. The recipient can be presented with additional information regarding the transport. If the container is re-used in a new transport cycle, the new sender can pro-actively replace a VIP that is likely to fail in the future. In other words, the data collected over time can contribute to predictive maintenance of the container.

The selection of the VIP materials influences a variety of technical parameters. The parameters relate to the transmission of the PCS inside the container, the transmission of the PCS outside the transport container and the rule-based processing of the PCS in the remote server computer. For VIP with materials having higher performance (i.e. materials in a higher performance class), it can be advantageous that the transmission and processing requires less energy, and that—in case of failure—corrective actions are simplified.

It is possible that containers with different VIP materials will co-exist. As a consequence, the technical parameters have to be differentiated. To keep the computational overhead low for such as differentiation, the VIPs can optionally be classified into (or assigned to) material classes (i.e. material performance classes), and the transport containers can optionally be categorized into (or assigned to) material categories. In units that transmit or process the PCS, the material-to-parameter relation is therefore represented by data structures that indicate the class (or the category).

The present invention not only relates to the container, but also to methods for operating the transport container and for operating the remote server computer, as well as to a computer program product. There are also aspects of computer-implemented method steps so that methods are at least partially implemented by computers.

BRIEF DESCRIPTION OF THE DRAWINGS

FIG. 7 illustrates a flow-chart diagram of a method for operating transport container;

FIG. 8 illustrates a flow-chart diagram of a method for operating a remote server computer;

FIG. 10 illustrates a flow-chart diagram of a method to explain the consequences of replacing VIPs with different materials.

DETAILED DESCRIPTION

Writing Conventions

The description begins by introducing writing conventions. The lowercase letter "t" stands for a point in time; the uppercase letter "T" stands for a time interval (i.e. a duration) between two points in time; and "θ" stands for the temperature in degree Celsius ° C. Indices "i" and "j" indicate that certain elements can be available in pluralities. Index "i" stands for a plurality of N structural elements, and index "j" stands for a plurality of physical properties. The term "container" comprises equipment for transport or storage such as packages, parcels, boxes, cartons or the like. The term "arrangement" stands for a combination of two units, for example for a combination of a sensor unit with a transmitter unit. State values of the container are given by uppercase words, such as FUNCTION, state values having a representation as computer data are given by uppercase words plus an asterisk, such as FUNCTION*. Material classes and container categories are indicated by #1, #2 and so on.

Container with VIP

Figure 1:
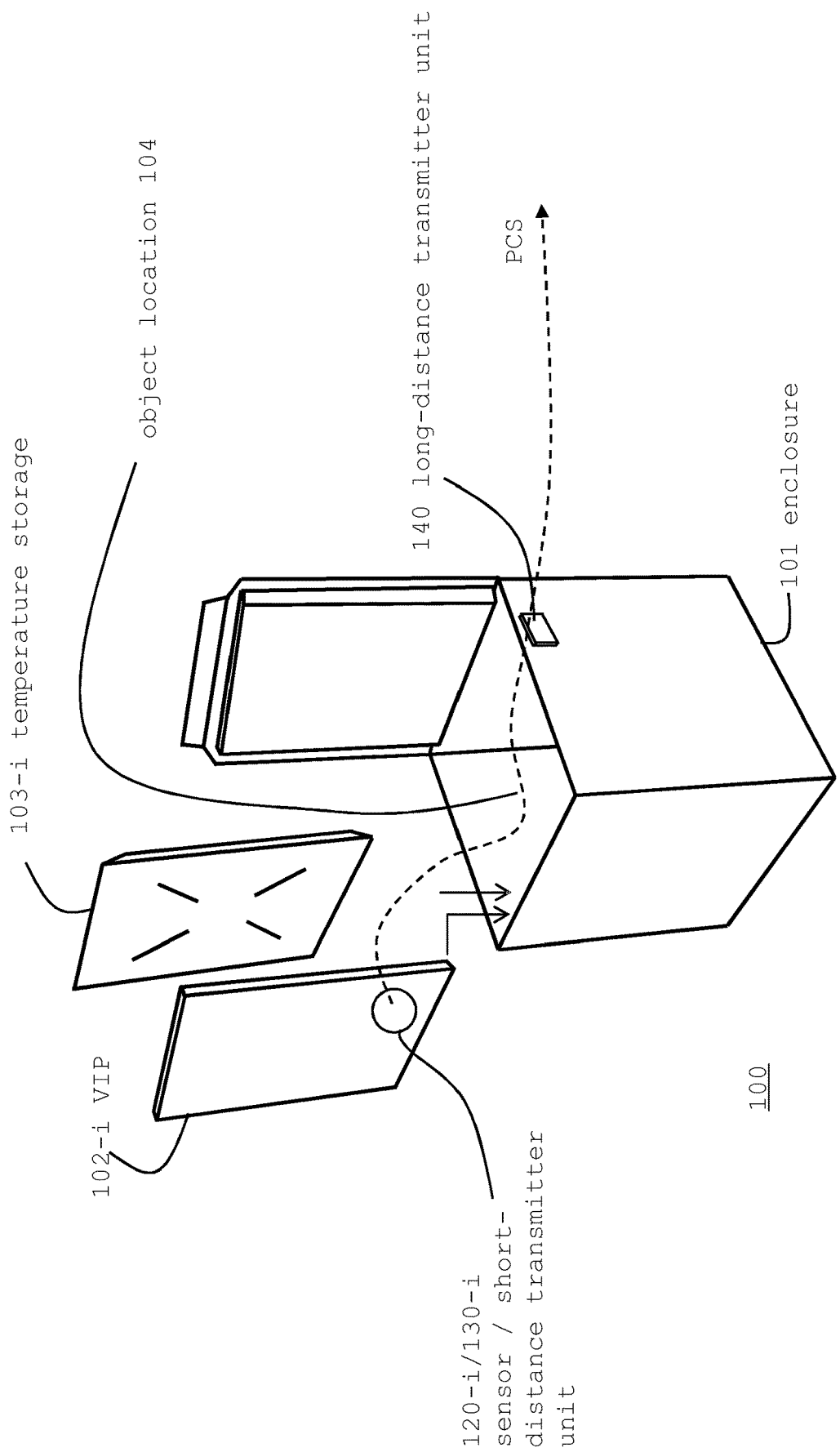
FIG. 1 illustrates a side-view of the transport container for transporting an object, the container being illustrated with a vacuum-insulation panel (VIP), with a sensor-transmitter arrangement and with a transmitter unit.

FIG. 1 illustrates a side-view of transport container 100 for transporting an object. Looking from outside to inside, transport container 100 comprises enclosure 101, at least one vacuum insulation panel 102-$i$ (hereinafter VIP), and temperature storage unit 103-$i$ (being optional). These elements in combination define object location 104.

Enclosure 101 can be made from a variety of materials, such as plastics, card-board or paper, metal, composite material, expanded Polypropylene (EPP), expanded polystyrene (EPS) or the like, alone or in combination.

VIP 102-$i$ can be made from a variety of materials ("VIP material"), wherein the materials are differentiated into materials of the core and materials of the foil (or film). The core materials are discussed first. The core material can be materials such as Polyurethane (PU) or EPS. High-performance insulating material is commercially available, for example, from BASF SE, Ludwigshafen, Germany, as SLENTITE.

Since the selection of the VIP material influences a number of technical parameters, the description herein also differentiates between materials further. As used herein, (a) "VIP-PU/EPS" stands for a VIP 102-$i$ made by using PU and/or by using EPS in the core;

(b1) "VIP with organic aerogel" (or "VIP-OAG") stands for a VIP made by using an organic aerogel in the core; and (b2) "VIP with organic aerogel WIEGMANN et al." (or "VIP-OAG-W") stands for an VIP-OAG that has a core material made according to a method for manufacturing a composite element that is explained in the above-mentioned WO-publication WO 2016/046172 A2. More in detail, the publication describes the manufacturing method from page 10, line 32 to page 11, line 6. The publication also explains that the evacuate-enabled organic material ("evakuierbares organisches Material" in the publication) can be an organic aerogel, an organic xerogel, or an organic rigid-foam. This is also summarized in method claim 7 of the above-mentioned WO-publication WO 2016/046172 A2. The VIP is made with the evacuate-enabled organic material being an organic aerogel. The organic aerogel (described in that publication) is also referred to as "Wiegmann aerogel".

(b3) "VIP-OAG-W3" stands for a VIP-OAG-W in that the aerogel is manufactured according to example 3 on pages 14-15 of that WO-publication.

The foil materials are discussed in the following. The person of skill in the art can select the suitable foil. The foil can be a single layer foil or can be a multi-layer foil (of the same or of different materials). A description of foil materials is available in the above mentioned WO-publication WO2016/046172 A2. For example, the foil can be a metalized polymeric foil, or can be a polymeric foil without metallization. There are differences in properties such as gas permeability or water vapour diffusivity.

There can be any combinations between core material and foil material. It is noted that for VIP-OAG, VIP-OAG-W, VIP-OAG-W3, the foil enclosure or film enclosure of the core remains attached to the core even if the vacuum is destroyed. This enhances the capability of the VIP to provide thermal insulation.

Different selections and combinations of core and foil materials lead to a quality difference in the performance of the VIP. A material classification (into material performance classes) is therefore introduced as material class #1 #2 #3 etc. The description uses increasing class numbers (or classification numbers) to indicate increasing performance, as discussed in connection with FIG. 5A. A VIP in material class #2 has better performance than a VIP in material class #1.

Since the performance of the VIP remains important even in case the foil has been damaged (the vacuum inside the VIP disappears), the classification can focus on the panel material. In other words, the panel material may have more weight for the class than the foil material.

The material classes represent differences between materials, but they do not necessarily represent the absolute chemical content of the material. For example only and disregarding the foil materials, VIP-PU/EPS can be assigned to class #1, VIP-OAG to class #2, VIP-OAG-W" to class #3, and VIP-OAG-W3 to class #4.

Temperature storage unit 103-$i$ for passive cooling is provided optionally. For example, temperature storage unit 103 comprises cooling material such as dry ice, or comprises a phase-change material (PCM). PCMs are substances with a high heat of fusion that are capable of storing and releasing large amounts of energy. When the material changes from solid to liquid, heat is absorbed, thus resulting in a cooling effect. Depending on the object to be transported, heating materials could also be used instead.

Object location 104 is the product containment space in which the object can be placed or inserted. VIP 102-$i$ (and optionally unit 103-$i$) thermally insulates object location 104. Further thermal insulation can be obtained through enclosure 101.

At container 100, a lid is provided for inserting the object and for removing the object. During transport, the lid remains closed.

With enclosure 101, VIP 102, temperature storage unit 103 and location 104, container would correspond to a container known in the art, such as a container known from the above-mentioned WO 2009/019251 A1.

Container and Panel Condition Signal PCS

However, container 100 according to the present invention further comprises sensor unit 120-$i$, short-distance transmitter unit 130-$i$ and long-distance transmitter unit 140. Long-distance transmitter unit 140 can be located inside or outside container 100; transmitter unit 140 can be associated with enclosure 101, for example, by being mounted on enclosure 101. As sensor unit 120-$i$ and short-distance transmitter unit 130-$i$ can be integrated into a single device they are collectively referred to as sensor-transmitter arrangement 120-$i$/130-$i$. The term "short distance" refers to communication inside container 100 (between units 130-$i$ and unit 140), and the term "long distance" refers to communication to a signal receiver located outside container 100. Being part of a communication system (cf. system 202 in FIGS. 3-4), the signal receiver can be a base station (BS), a wireless local area (WLAN) station, a mobile device, a signal reader in a logistics system (e.g., an RFID reader) etc.

As illustrated by a dashed arrow, a panel-condition signal (PCS) is provided that goes from arrangement 120-$i$/130-$i$ to unit 140. As it will be explained with more detail in connection with FIGS. 3-4, the PCS then goes to the signal receiver and to the remote server computer.

Container with Multiple VIPs, Vector PCS

Figure 2:
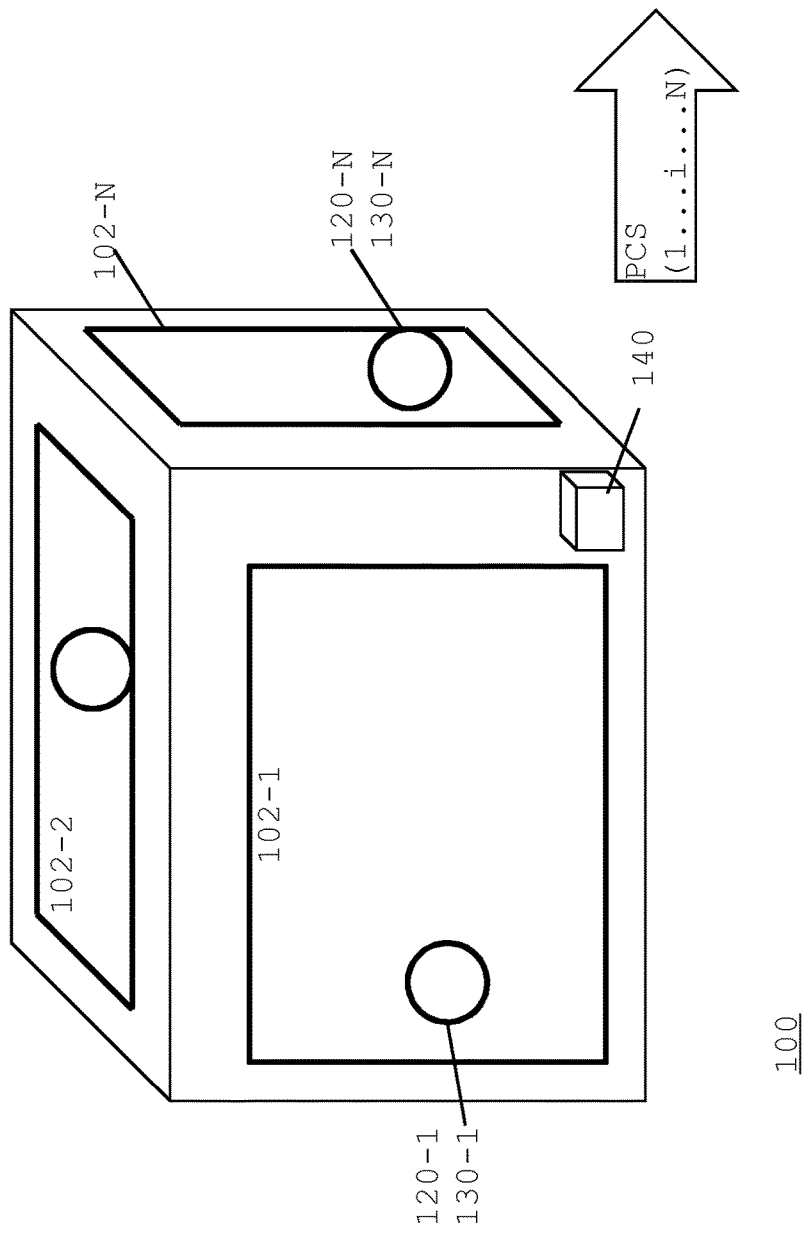
FIG. 2 illustrates the transport container with multiple VIPs and multiple sensor-transmitter arrangements.

FIG. 2 illustrates transport container 100 with multiple VIPs and multiple sensor-transmitter arrangements 120-$i$/130-$i$. VIPs 102-$i$ and sensor-transmitter arrangements 120-$i$/130-$i$ can be available on the N sides of the container. In the example, container 100 is a cuboid with N=6 sides. Using a different number of VIPs is possible. For example, location 104 can be segmented by VIPs so that the number N would be higher. There is no need that all the VIPs are of the same size. It is noted that a single long-distance transmitter unit 140 is sufficient.

Persons of skill in the art can distinguish the different VIPs and can provide panel identification to the communication between short-distance transmitter units 130-$i$ and long-distance transmitter unit 140. Techniques such as serializing, multiplexing, encrypting, identifying, selecting, filtering can be used. The PCS (arrow symbol) is considered to be a vector for the PCS of the N VIPs.

It is likely that multiple transport containers 100 are being transported in the same vehicle or stored in the same area. To prevent parasitic interaction between short-distance transmitters of neighbouring containers, persons of skill in the art can apply measures, such as by providing shielding and/or by providing unit identifiers that are unique.

Container and Server—from the PCS to State Representations

Figure 3:
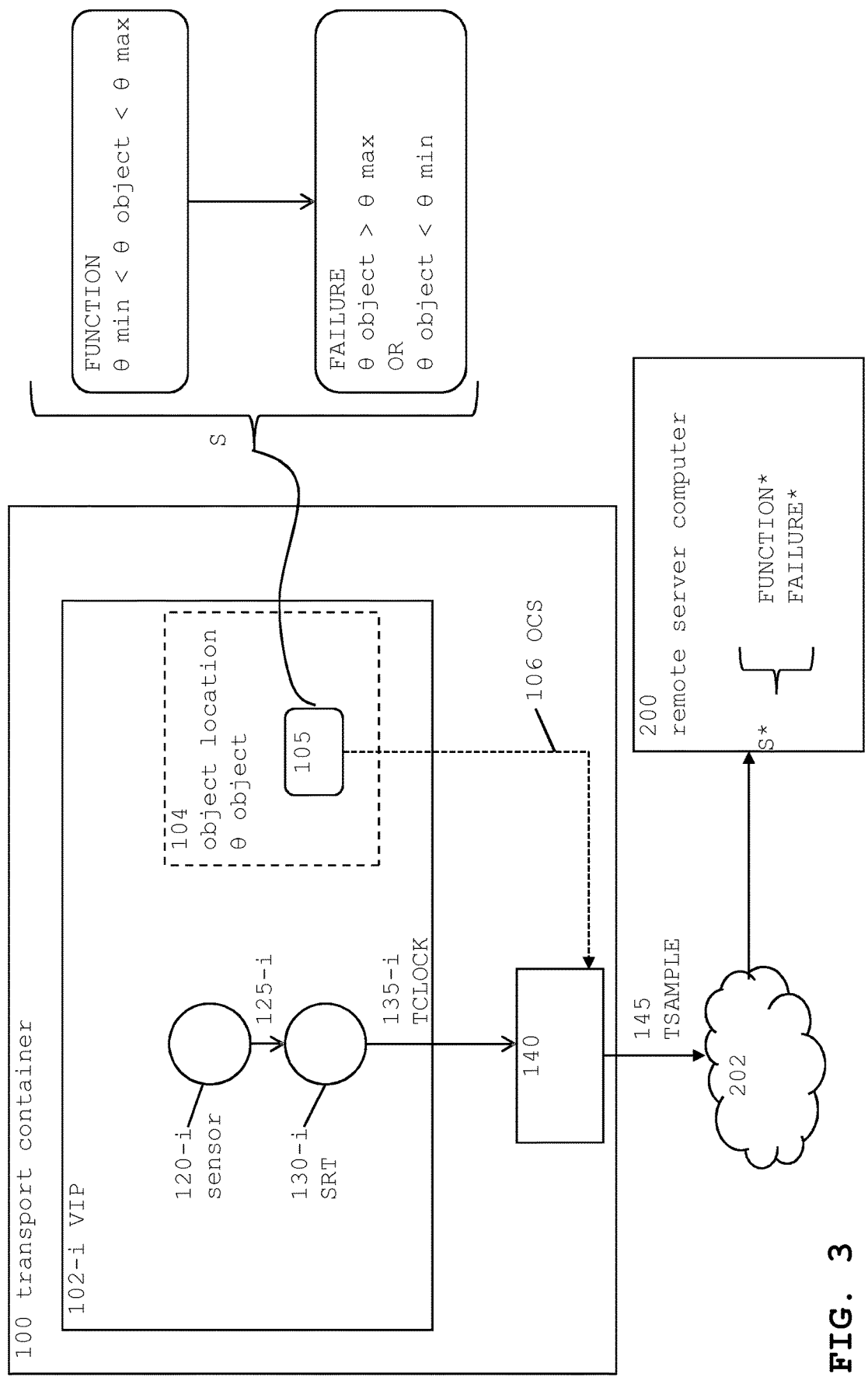
FIG. 3 illustrates a block diagram of the transport container that communicates with a remote server.

FIG. 3 illustrates a block diagram of transport container 100 that communicates with remote server computer 200 (hereinafter server 200). The figure also illustrates structural and functional details for the units, especially for the units that provide the PCS.

Transport container 100 has an operation state S, but data that represents the state values is determined by server 200 by processing the panel condition signal (PCS). The PCS is communicated from container 100 through communication network 202. Server 200 stores a representation S* of that operational state S.

The temperature of object location 104 is indicative of the operation state S (of transport container 100). It can be assumed that the temperature of object 105 (e.g., a medicinal product) is substantially the same as the temperature of object location 104. In the following, the term "θ OBJECT" is therefore used collectively for both the object temperature and the location temperature.

The operation state S of container 100 can be at least a binary state taking either a first state value as long as the object temperature θ OBJECT remains within a pre-defined temperature range (θ MIN, θ MAX), or taking a second state value when the object temperature (θ OBJECT) leaves the pre-defined temperature range (θ MIN, θ MAX). The first state value stands for FUNCTION of container 100, and the second state value stands for FAILURE of container 100.

State transitions are only allowed in one direction: from FUNCTION to FAILURE. In other words, once the container fails, it can't re-gain its FUNCTION. In case of object 105 being a medicinal product, it would lose its function for administration to a patient and would have to be destroyed.

The one-direction state transition is also implemented in server 200. The only exception from the one-direction approach is a reset, when container 100 is being re-equipped with a different object (cf. phase 0, in FIG. 4). Server 200 determines the state representation S* (i.e. FUNCTION* or FAILURE*) by processing the PCS (and optionally other data) received from container 200 through network 202 and by applying pre-defined rules. The rules are based on the above-mentioned property-to-temperature relations. It is advantageous to use further state values, such as PRE-FAILURE*, for taking corrective actions (cf. FIGS. 4-5).

Details for Units that Provide the PCS

The description of FIG. 3 continues by describing the units that provide the PCS.

Sensor unit 120-i is assembled at VIP 102-i. It may be advantageous to have at least one sensor unit per VIP. Sensor unit 120-i provides PCS-i that corresponds to a measurement value Vij for at least one physical property of VIP 102-i. The physical property influences the object temperature θ OBJECT. Some properties change can be indicate the occurrence of a VIP event. For example, after the event, a VIP can no longer insulate temperature differences. The change of the property can be that a property value exceeds a particular threshold or goes below particular threshold. The same principle applies for changes over time (change rates) in view of thresholds. For example, a sudden change may indicative of an event, while a gradual change might not be indicative.

The following is a discussion of several physical properties. Depending on the property, sensor unit 120-i can comprise a
 (1) gas pressure sensor,
 (2) a conductivity sensor,
 (3) a humidity sensor,
 (4) a thermometer,
 (5) a vibration sensor (i.e. a microphone), or other sensors.

(1) The gas pressure P(i) inside the VIP-i being an absolute pressure (or the pressure difference to the air pressure) is an indicator for the performance of the VIP. If the vacuum vanishes, for example, due to micro-perforations on the surface of the VIP, the VIP is reduced to an insulation panel with much less efficient insulation. Pressure sensors are known in the art. DE 10 2006 042 426 B4 explains a pressure sensitive switch that depending on a pressure threshold provides a signal by opening or closing an electrical circuit. WO 2013/116843 A1 explains a sensor with a dielectric film that changes its electrical conductance when exposed to an oxidizing substance, such as water vapour. The sensor can be implemented as a disk (e.g. aluminium) and a piece of fleece (or other flexible material) located inside the VIP in combination with a measurement head located outside the VIP. Depending on the pressure, the disk bends (or changes its position), and the head converts the bending into a signal.

(2) The electrical conductivity of the VIP, or the thermal conductivity of the VIP can be indicative (of an event) as well.

(3) The humidity of the VIP can increase, for example, if temperature storing unit 103 spoils or leaks, or if container 100 is located in hot and humid air (e.g., in a tropical country).

(4) The temperature of the VIP can also indicate that something happened with container 100, for example, if container 100 was opened.

(5) Vibration of the VIP can be indicative of failure or of increased failure likelihood.

Persons of skill in the art can select suitable sensors. It is noted that following a VIP event, the VIPs are disposed of. The sensors can be throw-away sensors that do not need to survive the VIP.

The measurement values Vij in PCS-i are available as electrical signals (e.g. voltage, current). At least one short-distance transmitter unit 130-i is adapted to transmit a first coding 135-i of PCS-i inside transport container 100. The first coding is a digital representation of the PCS-i.

Short-distance transmitter unit 130-i can be implemented as a radio transmitter. Unit 130-i can be located inside a metal foil of the VIP. Persons of skill in the art can select a suitable frequency range in that unit 130-i operates by transmitting through that metal foil.

In a first example, unit 130-i is implemented as a radio-frequency identification (RFID) transponder (cf. DE 102006 042 426 B4). In a second example, unit 130-i is implemented as a so-called station having a wireless network interface controller (WNIC) for communicating in a wireless local area network (WLAN, IEEE 802.11). In a third example, unit 130-i is implemented as a BLUETOOTH device (Bluetooth Special Interest Group, Inc.).

Short-distance transmitter unit 130-i can also be implemented as a wire that goes to the long-distance transmitter unit 140.

Figure 4:
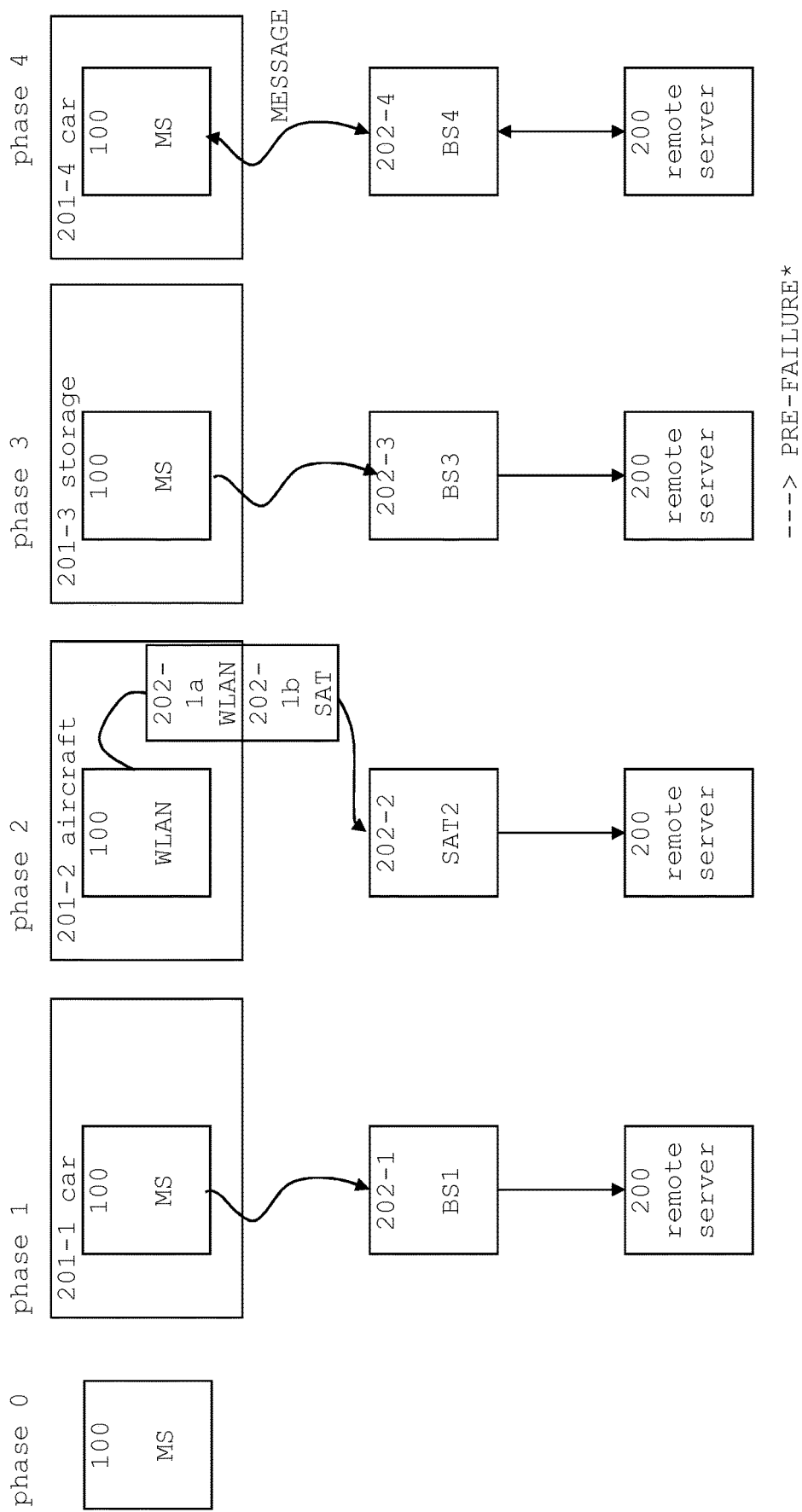
FIG. 4 illustrates a usage scenario of the transport container that is being transported.

As sensor-transmitter arrangements 120-i/130-i need electrical energy, they are adapted to receive electrical energy from an energy source. The person of skill in the art can provide an appropriate source. The following explanation therefore only gives some examples:

Supercapacitors can be loaded at the point in time when container 100 is being prepared for use (cf. FIG. 4, phase 0). A radio network of long-distance transmitter unit 140 can provide the energy in a wireless fashion. Vibration generators are generators that convert kinetic energy (movement of the container during transport) into electrical energy. Batteries can be provided, such as button cells or watch batteries. A radio network that is available in the surroundings of container 100 could also provide the energy. Sensor-transmitter arrangements 120-i/130-could be connected to long-distance transmitter unit 140 by wires, for energy supply and for signal transmission. Persons of skill in the art can combine the sources.

PCS and Time Intervals

In an embodiment, long-distance transmitter unit 140 is adapted to (periodically or non-periodically) receive the first coding 135-i (of the PCS-i) from short-distance transmitter unit 130-i and to transmit second coding 145 of the PCS-i to remote server computer 200. Long-distance transmitter unit 140 converts first coding 135-i (from i=1 to N) into second coding 145. Second coding 145 is a digital representation of the first coding 135-i (from i=1 to N) and is therefore also a digital representation of the PCS-i (for i=1 to N, all VIP). Looking at the periods and intervals, long-distance transmitter unit 140 receives the PCS-i (in the first coding) at T CLOCK intervals, and transmits the second coding at intervals with a maximal duration T SAMPLE (transmission interval). In other words, first coding 135-i and second coding 145 are sequences of signal samples. The transmission interval T SAMPLE will be explained with more detail in a connection with a scenario (FIG. 5B), T CLOCK can be adapted accordingly taking the number N of VIPs into account, in many cases, both intervals are in a T CLOCK<T SAMPLE ratio.

In a further embodiment, periodic signal transmission can be replaced by the above-mentioned non-periodic transmission. The transmission interval T SAMPLE would then be a time interval in that no data is being transmitted.

In both cases, T SAMPLE is selected such that monitoring the container is real-time monitoring so that taking corrective actions is possible.

Long-distance transmitter unit 140 can be implemented as a mobile station (MS) in a cellular based communication system. Since the container is to be transported into different geographic regions, it is advantageous to implement it as a multi-standard device that operates internationally in systems according to LTE, GSM/EDGE, UMTS/HSPA, CDMA, CDMA2000 and others.

Besides the sensor for the conditions of the VIPs, the person of skill in the art can provide further sensors to obtain further condition signals. Long-distance transmitter unit 140 can forwards these further condition signals to remote server 200 as well. This allows monitoring the conditions of object 105, object location 104 and so on, and even monitoring the container 100 as a whole.

Intra-container communication (using further transmitter units) is possible. The figure illustrates this by way of example with a dotted line standing for the object condition signal (OCS) 106 from object 105 to long-distance transmitter unit 140. The OCS can represent the temperature of the object ($\theta$ OBJECT).

A sensor can be connected to long-distance transmitter unit 140 or can be part of it. For example, the sensor can be a thermometer to measure the temperature of the outer surface of the container, corresponding to the ambient temperature $\theta$ AMBIENT. The sensor can also be a position unit that identifies the geographic position of the container (geographical longitude and latitude; address with identification of location by alphanumeric identifiers such as country, region, city, street etc. names). Position units can be responsive to signals from global navigation satellite systems (such as Global Positioning System GPS, GLONASS, GALILEO, BEIDOU etc.). It is noted that satellite signals may not be available in all circumstances of transportation, for example, if the container 100 is being transported inside a vehicle, but there is no need to obtain the position all of the time. Sensors as such are available in mobile devices (so-called smart-phones). A user interface could serve as a sensor to collect data from the person handling the container.

Usage Scenario for the Container and the PCS—Transportation being Normal

FIG. 4 illustrates a usage scenario of the transport container that is being transported. For convenience of illustration, transportation is illustrated in phases, with the phases being differentiated according to the transportation carrier (or courier) and according to the first element of the long-distance communication (part of network 202) being the communication counterpart to long-distance transmitter 140. During transportation, container 100 and server 200 will remain the same physical thing. To illustrate the responsiveness of container 100 and server 200 to events, towards the end of the transportation (at phase 4), the explanation assumes a VIP event. This event will trigger server 200 to shortly modify the transportation schedule in order to prevent an object event. At least indirectly, server 200 influences the transportation schedule, by causing the container to reach a serve point, such as a particular hospital that is prepared to handle corrective actions.

In an initial phase—phase 0—the object is inserted into container 100. Data is re-set for a particular transportation, i.e. for transporting a particular object 105 in a particular container 100 from particular initial location A to particular target location B. The transportation route can be known in advance. Phase 0 also stands for starting data collection by that server 200 collects and stores data received from container 100, such as the PCS (for all VIPs), optionally the OCS (cf. 106 in FIG. 3), meta data (e.g., position data) relating to the transport etc.

In transportation phase 1, container 100 is being transported by car. Long-distance transmitter unit 140 operates as mobile station MS in a cellular phone network 202-1 with base station BS1. As the car is driving to an airport, long-distance transmitter unit 140 sends (at least) the PCS to remote server 200 without interruptions.

In transportation phase 2, container 100 is being transported by air, with long-distance transmitter unit 140 operating as a WLAN unit that communicates with WLAN station 202-1a that is part of the aircraft. (WLAN station 202-1a acts as a gateway). On-board transmitter 202-1b communicates with a satellite based system 202-2 that is communicatively coupled to remote server computer 200.

The aircraft is an example for a container location with limited communication to remote server computer 200. During flight, the communication might be interrupted. Long-distance transmitter 140 can buffer PCS (and other data) over time and forward the signals once a satellite channel becomes available again. (Buffering is available in general and not limited for such situations. Buffering can also be implemented otherwise, for example by on-board transmitter 202-1b.)

Usage Scenario—Transportation Turning Critical, but with Corrective Action

In transportation phase 3, container 100 is being stored at the destination airport near the target location B. There might be many reasons, such as for example, waiting for customs clearance. Long-distance transmitter unit 140 operates as mobile station MS in a cellular phone network 202-3 having base station BS3. BS3 is communicatively coupled to remote server computer 200, and the communication to remote server 200 goes without interruption. In the example, phase 3 stands for an extreme environmental condition, and container 100 might have been outside the aircraft under the sun in a tropical country. Air-conditioning at customs might have failed. To make the situation even more severe, the container might have fallen to the ground so that one of the VIPs starts to leak. The pressure value for the VIP exceeds a threshold (VIP event) and container 100 goes from FUNCTION to PRE-FAILURE state. The PCS comprises pressure values for that VIP. Remote server 200—in applying the pre-defined rules—evaluates the pressure change and detects the occurrence of the VIP event (for a particular VIP). The state change is also represented in remote server 200 (FUNCTION* to PRE-FAILURE*).

In transportation phase 4, container 100 is again to be transported by car, with long-distance transmitter unit 140 again operating as mobile station MS in a cellular phone network 202-4 with a base station BS4. PCS is being forwarded to remote server 200. Since remote server 200 has detected the PRE-FAILURE state, it applies counter-measure rules: first it identifies the physical location of container 100 (here: on the road between the destination airport and target location B) and a particular handling agent (here: a parcel carrier). Second, remote server 200 sends an instruction message to the agent (for example, via communication system 202 or otherwise, bi-directional arrows). The instruction message can be assembled from pre-defined text portions. Remote server 200 also informs the airport hospital that a container with a particular failed VIP is about to arrive. This information could be communicated in a further message. The hospital staff can intervene and repair the container by replacing the particular VIP. The hospital staff could also place the object into a different container. As in the example, the instruction message can be tailored to the role of the person handling the container on a need-to-know base.

Transportation phase 4 would be interrupted for a short time, but the object would not be in danger. Despite the VIP event, the object event is prevented.

The scenario of FIG. 4 is simplified, and persons of skill in the art can program remote server computer 200 accordingly. It is noted that server 200 can be part of a logistics back-end system that includes further servers. In phases 3-4, a VIP event was detected (in phase 3) and a corrective action was taken (in phase 4), not immediately, but within an appropriate time interval. The description continues with an explanation on these circumstances, with the focus on the timing.

Time Diagram in Relation to Thermal Insulation

Figure 5A:
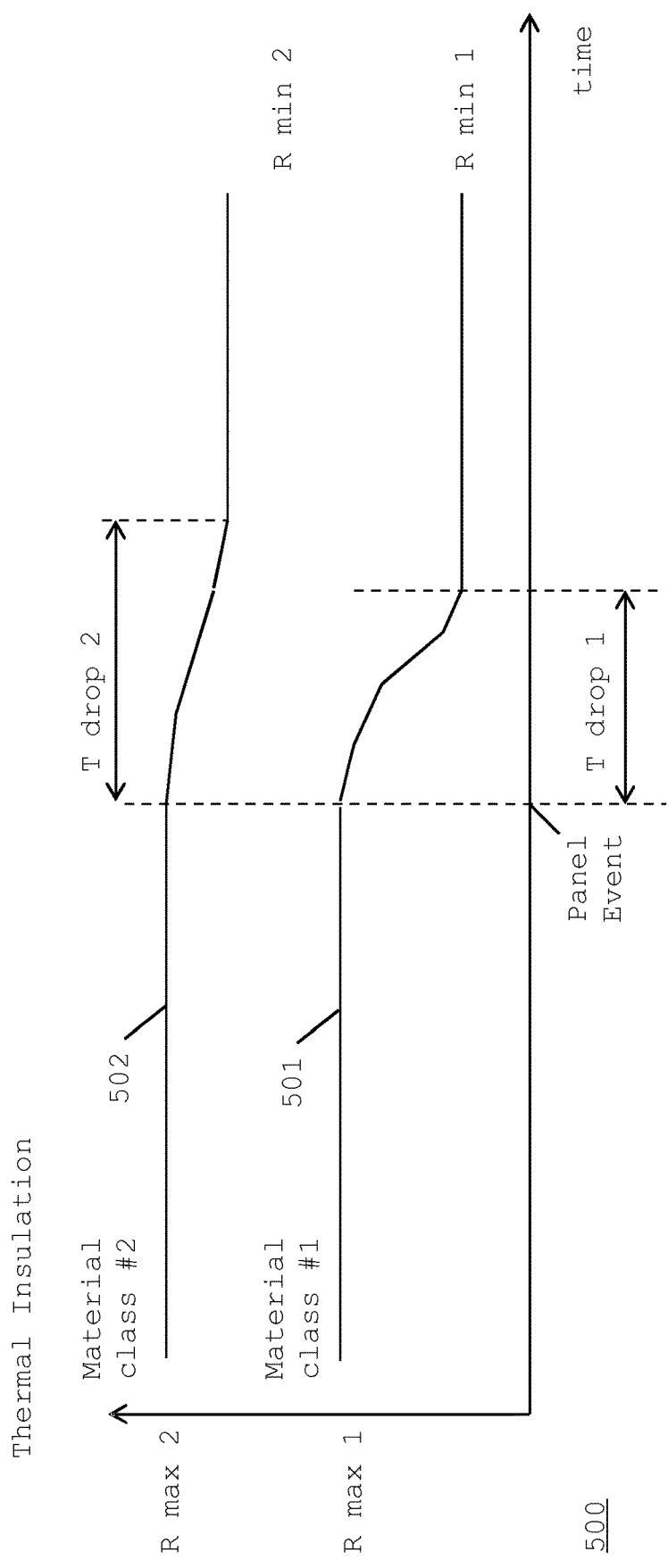
FIG. 5A illustrates a simplified time-diagram of the thermal insulation, for VIPs using different materials.

FIG. 5A illustrates a simplified time-diagram 500 of the thermal insulation (or resistance "R"), for VIPs using different materials. Thermal insulation can be quantified by the well-known thermal conductivity, the property of a material to conduct heat (measured in milliwatts per meter kelvin; mW/m*K). The relation is reciprocal: Higher values for thermal conductivity indicate more thermal insulation, and vice versa. Absolute values are not discussed here, but a relative change of the thermal insulation is discussed for a state of the VIP before and after a panel event (e.g., panel perforation).

Graph 501 shows the thermal insulation for a VIP using in material class #1, and graph 502 shows the thermal insulation for a VIP in material class #2. For both VIP materials, a panel event (e.g., perforation of the VIP, dashed vertical line) drops the thermal insulation from a maximal value (R max, or initial value) to a minimal value (R min, or final value), although at different rates. The VIP in class #1 loses its conductivity faster than the VIP in class #2 (T drop 1<T drop 2). In other words, the VIP in material class #2 shows better insulation retention even for panel events. Initially, the VIP in material class #2 shows higher insulation (i.e. R max 2) than the VIP in material class #1 (i.e. R max 1). This relation also remains unchanged after the event: the (final) thermal insulation of the VIP in material class #2 is still higher than the (final) thermal insulation of the VIP in material class #2 (i.e., R min 2>R min 1).

Looking at the above-identified particular materials, a VIP in material class #1 can be "VIP-PU/EPS", and a VIP in material class #2 can be a "VIP-organic aerogel". For simplicity of explanation, the foil material is not discussed here.

Higher initial insulation R max, higher final insulation R min, and the resulting lower drop rate make the VIP in material class #2 advantageous over the VIP in material class #1. This also influences a number of other technical parameters, among them parameters relating to the transmission of the data to from container 100 to remote computer 200 (e.g. PCS, transmission interval) and parameters that relating to corrective actions (handling a container if a panel event is detected).

In other words, upgrading container 100 by replacing some or all VIPs in material class #1 with VIPs in material class #2 can change the technical parameters. This parameter change can lead to an overall reduction of energy consumption (e.g., of the transmitter units, and of the remote computer). More details for such technical parameters are explained in the following.

VIP Material Categories and Container Categories

The principle explained in connection with FIG. 5A could be applied to material classes #1, #2, #3 and so on. In other words, as the VIP materials are categorized into classes, the transport containers can be categorized as well. For simplicity of explanation, a container in class #1 contains VIPs in material class #1 only, a container in class #2 contains VIPs in material class #2 only, and so on. The person of skill in the art can find a suitable intermediate category for a transport container with VIPs in different classes (such as #1 and #2). Modification rules can be applied optionally. For example, a transport container having 5 VIPs in material class #2 and 1 VIP in material class #1 could still be categorized as a category #2 container.

Time Diagrams in Relation to the Scenario

Figure 5B:
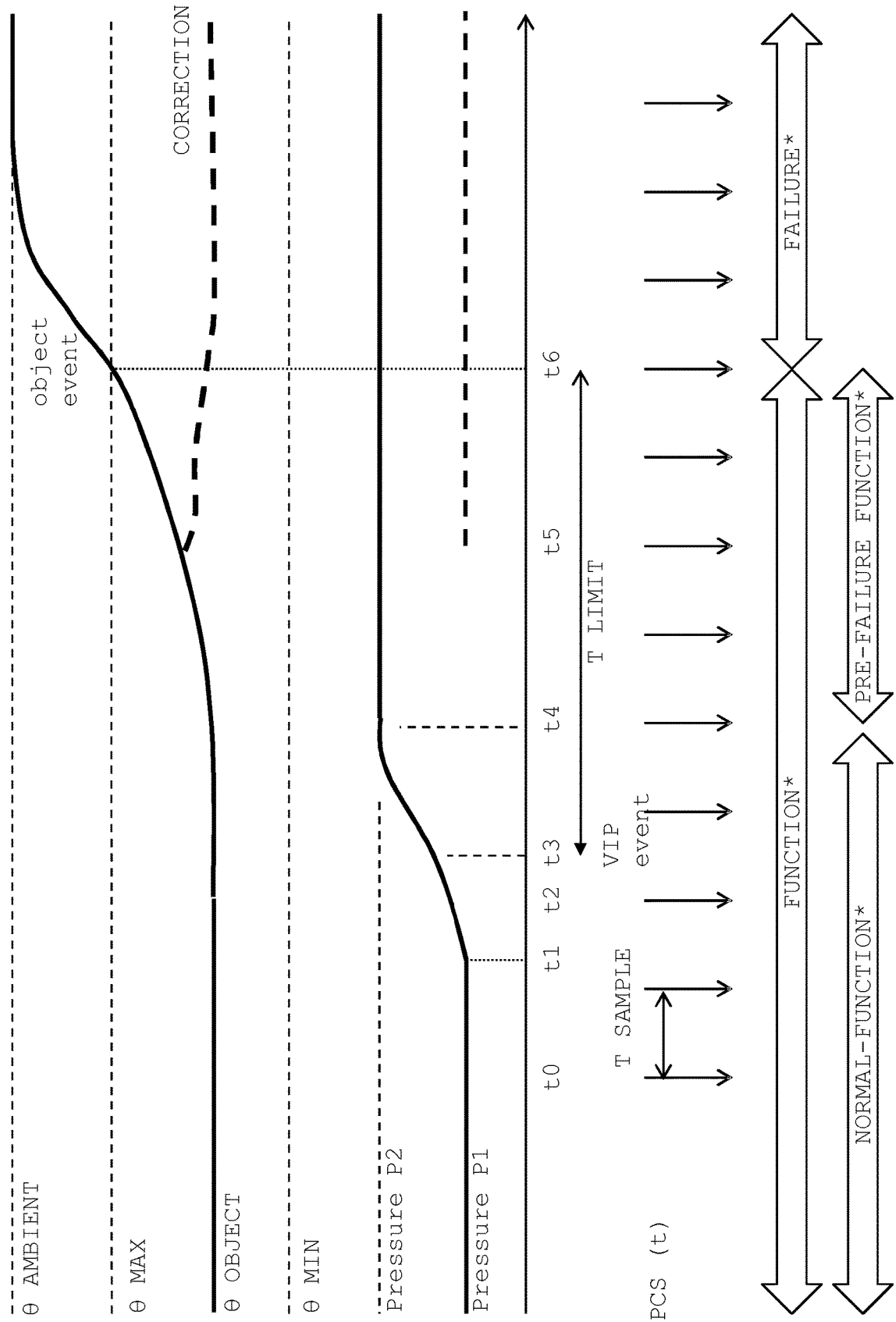
FIGS. 5B and 5C illustrate time-diagrams of the object temperature within lower and upper limits, of the pressure inside a VIP, and of state values of the transport container.
Figure 5C:
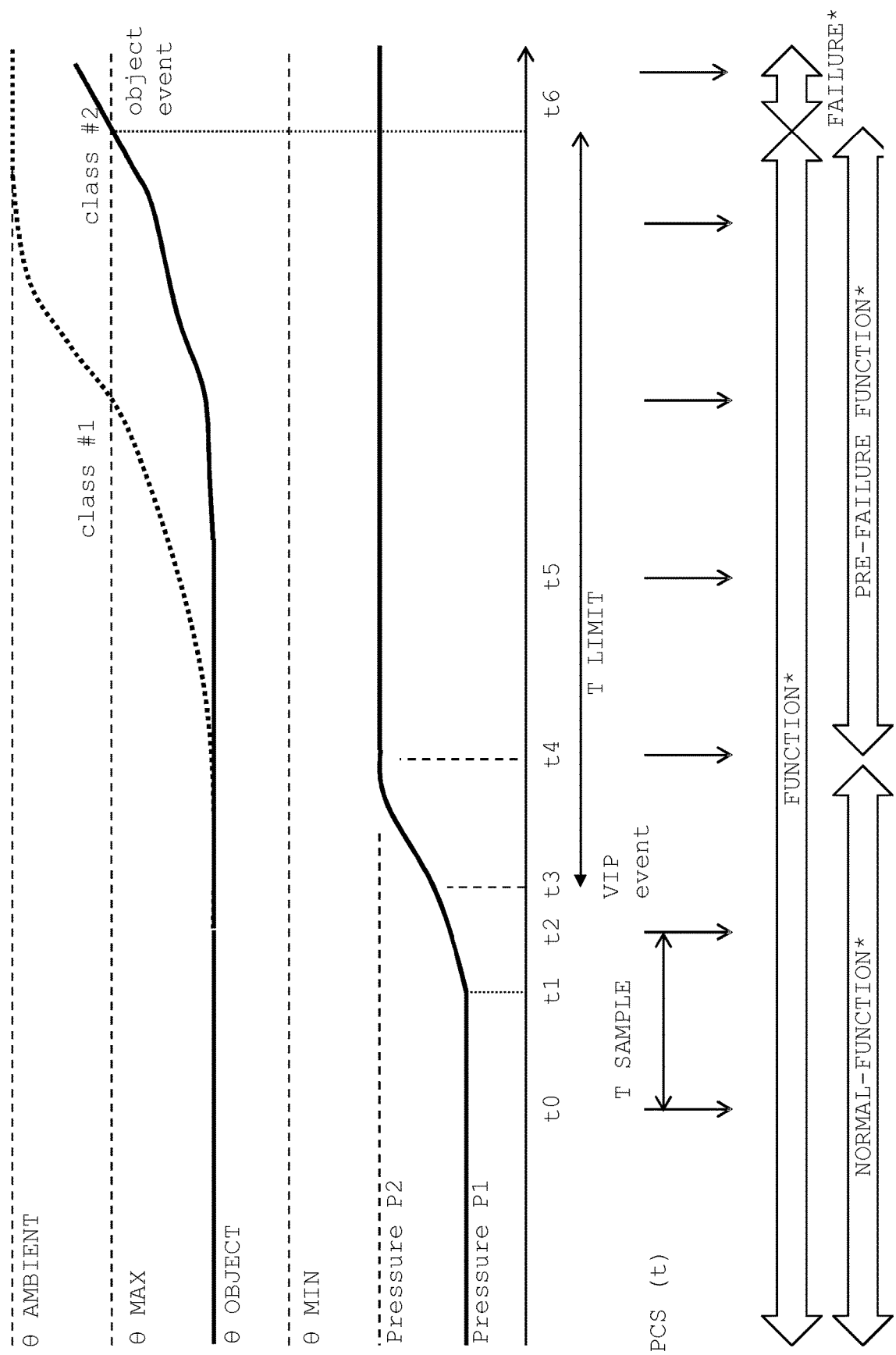

FIGS. 5B and 5C illustrate a time-diagrams of the object temperature within lower and upper limits, of the pressure inside a particular VIP, and state values of the transport container as represented * by server 200. For simplicity of explanation, the description assumes that the PCS only communicates a single physical property to the server, being the pressure of a particular VIP. In real implementations, temperatures and other properties can also be tracked. The example of FIGS. 5B and 5C at least partly fits to the scenario of FIG. 4. The diagrams are not up-to-scale.

FIGS. 5B and 5C assume different materials for the VIPs, using material class #1 (FIG. 5B, e.g., VIP-PU/EPS) and using material class #2 (in FIG. 5C, e.g., organic aerogel). For the following description of FIG. 5B, the material classes are not yet relevant.

In the figures, the time progresses from left to right. Looking top down, the diagram has 3 parts.

In the first part, the diagram shows physical properties belonging to the container, and changes at time points t0, t1, etc. θ AMBIENT is the temperature of the surrounding environment of container 100, for example, the temperature inside the car, the cargo bay of the aircraft, or—as in the phase 3—the storage area without air conditioning. This is the highest temperature given in FIG. 5B. θ AMBIENT is assumed to be constant all of the time. θ MAX and θ MIN limit a temperature range. θ OBJECT is the temperature of the object location 104 (and of object 105). Pressure P1 and P2 stand for extreme values of the gas pressure in one of the VIPs, with P1 symbolizing that vacuum, and P2 symbolizing non-vacuum.

In the second part, the diagram uses vertical lines to symbolize that long-distance transmitter unit 140 forwards PCS (t) to the remote server 200. The lines are illustrated in equal distance symbolizing T SAMPLE being constant all over time (periodic transmission in this example). Again, this illustration is simplified, T SAMPLE can vary, and the communication can be interrupted (cf. aircraft in phase 2 of FIG. 4).

In the third part, the diagram uses large arrows that indicate the representation of the state values in the server. The server distinguishes FUNCTION* from FAILURE*, and further differentiates NORMAL-FUNCTION* and PRE-FAILURE-FUNCTION*.

The server applies rules that are set up according to the above-mentioned property-to-temperature-relations. The relations include the expected times between events, such as between the VIP event and the object event. In the particular example, the relations take the destruction of the vacuum as the VIP event and take the increase of θ OBJECT to θ MAX as the object event. Further conditions can be considered, such as a certain ambient temperature (e.g., worst case estimation 50° C.). The relation can be determined by conducting simple experiments, without undue burden, such as placing a container with a defective VIP into a climate chamber at 50° C., and measuring the time it takes θ OBJECT to go from 10° C. to 25° C. The rule can be derived accordingly and stored in the server in an appropriate format, such as in a look-up table. The person of skill in the art will consider tolerances, and can relate to the rule to duration T LIMIT that is shorter than the time that was actually measured.

The rules can comprise variances, such the expected presence of air-conditioning during all transportation phases (18 . . . 22° C. ambient, "premium transportation") vs. the expected non-presence of air-conditioning. Simplified, air-conditioning makes T LIMIT longer. The rules can take into account that temperature storage units 103-$i$ warm up over time (the overall duration of transport from phase 0 being a factor). Again simplified, as the unit 103-$i$ loose insulation capability at the end of the transportation phases, T LIMIT becomes shorter. The rules can take the material of other structural details of the container into account, such as the material of enclosure 101, the N number of VIPs etc.

Back to FIG. 5B, the developments over time are now discussed with more detail.

At time point t0, θ OBJECT is below θ MAX, the VIP is still being evacuated at P1, PCS (t0) going to the server comprises at least a value for the pressure. The server applies the rules and determines the container to be in FUNCTION state and stores FUNCTION* in a database. More in detail FUNCTION* is NORMAL-FUNCTION*.

At time point t1, the container is moved abruptly (fallen down during transport or handling) and the VIP suffers a tiny leak. This is not yet detected.

At time point t2, the VIP pressure has increased, but still remains below a critical predefined threshold. The server evaluates PCS(t2) to determine NORMAL-FUNCTION*.

At time point t3, the VIP pressure has further increased, and reaches the threshold. This is the time of the VIP event. At t3, there is no communication to the server so that NORMAL-FUNCTION* remains.

At time point t4, PCS (t4) comprises the actual pressure value (above threshold). The server evaluates the state of the container to be FUNCTION* but also to be in PRE-FAILURE-FUNCTION*. Further, the server applies the rule to identify T LIMIT (e.g., from the look-up table). This means that—starting, for example, from t4—it will take a duration T LIMIT until the state value will change from PRE-FAILURE/PRE-FAILURE* be FAILURE/FAILURE* (in the figure at t6). The server can also identify the recommendation (for example, to perform a particular corrective action). In the example of FIG. 4, the recommendation is to modify the transportation route to stop over at a particular hospital to replace the broken VIP (and to cool down the object again).

T LIMIT can be considered as a residual functioning interval. Basically there are two options to define it: from the actual VIP event (at t3) to FAILURE* (at t6), or from t4 to t6. Since the duration from t3 to t4 is known (for example, from historic data, or simple experiments such as punching a VIP and measuring the time to evacuation), the person of skill in the art can select the suitable option. It is noted that tolerances should be considered.

After t4, the diagram branches into a scenario with an object event (bold lines), and into a scenario in that the object event is prevented (dashed lines, corresponding to the example of FIG. 4).

At time point t5 (bold line, object event assumed), the pressure P has reached P2: air went into the panel, and the insulation property of VIP decreases. As a consequence, θ OBJECT is higher than before, but still below θ MAX. The server still indicates PRE-FAILURE-FUNCTION*.

At time point t6 (bold line, object event assumed), this is t4 plus T LIMIT, the server switches the state value to FAILURE*. This corresponds approximately to the point in time when the container actually changes to FAILURE. t6 would correspond to the object event: the object would lose its function.

During t3 (VIP event) and t4 (PRE-FAILURE* detected) the actual state of the container is not yet represented by the server. However, this duration t4-t3 is short in comparison to duration of PRE-FAILURE. t4-t3 is related to the transmission interval T SAMPLE. The person of skill in the art can optimize T SAMPLE by taking factors into account, the factors comprise (a) the Nyquist-Shannon sampling theorem and (b) the energy consumption of long-distance transmitter unit 140 for sending the PCS in the second coding. T SAMPLE may vary accordingly.

However, as explained above, corrective actions can be taken (within T LIMIT). As illustrated by the dashed lines, the VIP regains the vacuum (P1) because it is replaced at t5 (or slightly later, but before t6). The object is also being cooled again (θ OBJECT).

As mentioned above, T SAMPLE is selected such that monitoring the container is real-time monitoring so that taking corrective actions is possible. T SAMPLE is therefore related to T LIMIT, but should be selected to be much shorter.

There is a further constraint that may influence the selection of T SAMPLE. Long-distance unit 140 is usually battery powered, and transmitting PCS in the second coding drains energy. In an embodiment, T SAMPLE is selected to be in the range from 10 seconds to 10 minutes. Conveniently, T SAMPLE is 60 seconds.

There will be cases in that corrective actions are not possible, for example, if the rules lead to immediate failure FAILURE* and/or to T LIMIT during that a corrective action is not possible.

Time Diagram for a Container Using VIPs with Different Materials

FIG. 5C again illustrates a time-diagram for the object temperature, of the pressure and of state values. As mentioned above, FIG. 5B referred to a VIP in material class #1, and FIG. 5C refers to a VIP in material class #2. To illustrate a contrast in container behaviour, FIG. 5C illustrates θ OBJECT for material #1 by a thin dotted line. FIG. 5C is further simplified so that corrective actions are not illustrated.

For simplicity of explanation it is further assumed that time points t1 (tiny leak), t2 (increased pressure, but below threshold), t3 (pressure at threshold), t4 (FUNCTION* to PRE-FAILURE FUNCTION*) refer to the situations as described in FIG. 5B. In case of the VIP event, θ OBJECT (for #2) raises but more slowly as θ OBJECT (for #1). As expressed by the mathematical derivative that is:

$$d\theta\ \text{OBJECT}\ \#2/dt < d\theta\ \text{OBJECT}\ \#1/dt$$

Due to the more advantageous material properties of VIP material #2 (i.e. higher material performance class), the intervals T SAMPLE (transmission interval) and T LIMIT (residual functioning interval) can be longer, that is

T SAMPLE #2>T SAMPLE #1

T LIMIT #2>T LIMIT #1

For example, T SAMPLE #2 can be 120 seconds (instead of 60 seconds in the FIG. 5B scenario). For example, T LIMIT #2 ca twice as long.

As a consequence, upgrading the VIP material (#1 to #2, or to even a higher class) allows modifying technical parameters that relate—at least—to the transmission of the second coding (145) of the PCS. Optionally, other modifications are possible: Sensing the PCS (sensor unit 120-$i$) and/or transmitting inside the container (unit 130-$i$) can be simplified to a lower frequency. Potentially this leads to effects such as saving electrical energy or using a more simplified design for the hardware components (sensor unit, transmission units etc., in the container)

For example, for a battery powered sensor unit, the battery capacity can be reduced or the battery can be used for a longer time; this having also an environmental effect in reducing waste (for empty batteries). Since T SAMPLE relates to the bandwidth of the communication to the remote server, bandwidth can be saved.

As a further consequence, with longer residual functioning (T LIMIT), the corrective actions can be simplified, or in some cases even be avoided. In the example scenario of FIG. 4, the corrective action might be simplified, or diverting to a particular hospital might not be required. Or, in the long term, the number of "repair facilities" can be reduced because a container (even a container that suffered a VIP event) can go a longer way.

Remote Server Using Rules to Process the PCS

Figure 6:
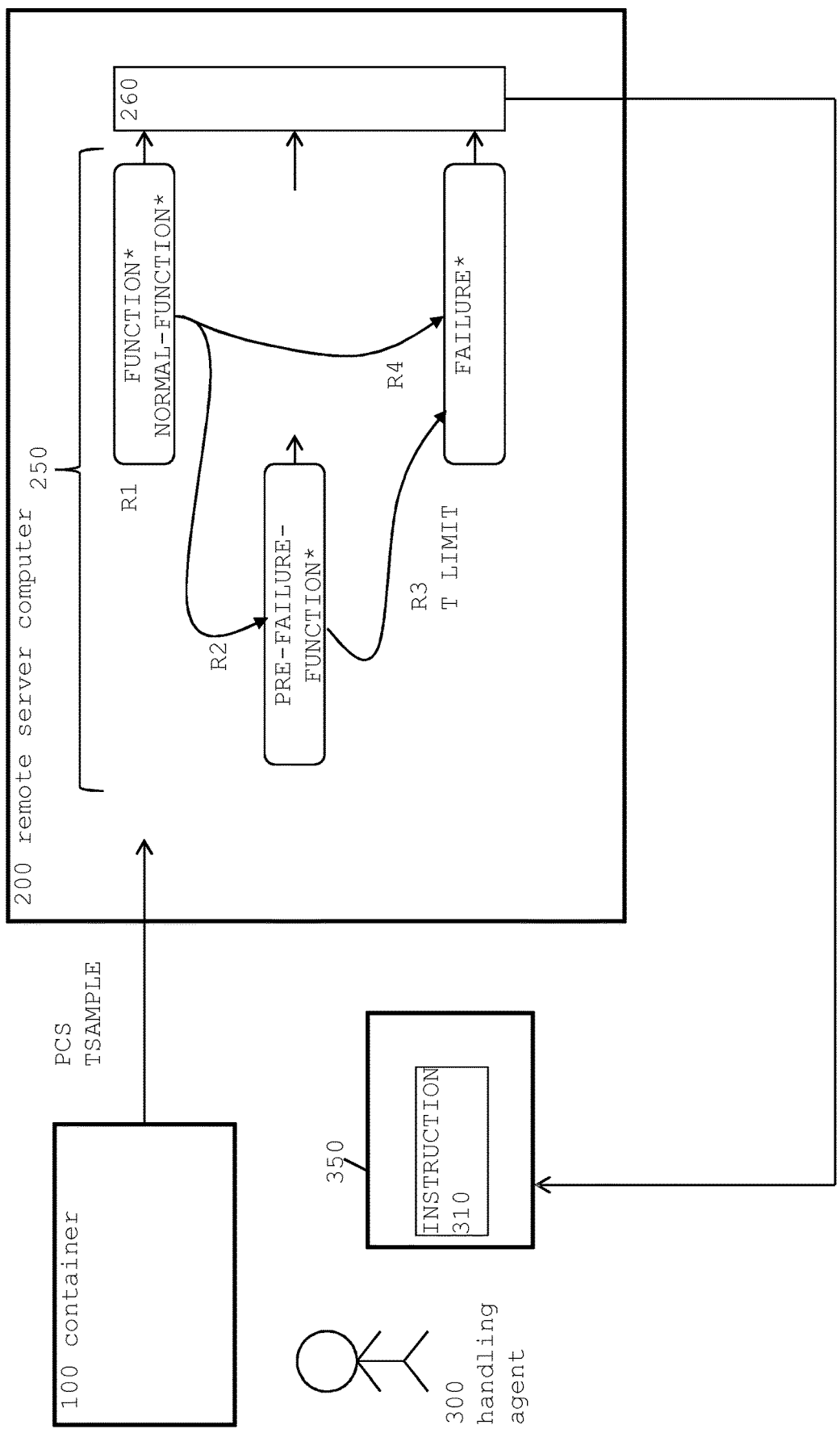
FIG. 6 illustrates data processing by the remote server.

FIG. 6 illustrates data processing by remote server computer 200 for communication with transport container 100 as described above. Server 200 comprises state value module 250 that is adapted to process the PCS (and other data) to determine the state value representation (e.g., FUNCTION* vs. FAILURE*) according to a set of predefined rules (R1, R2, R3, R4). As explained above, the rules are based on the property-to-temperature relations. State value module 250 receives the PCS (i.e., the vector for all N PCS-$i$, e.g., periodically with T SAMPLE) and—optionally—receives other data (e.g., object condition signal 106).

Module 250 is adapted to determine that the operation state of container 100 is a normal function state (NORMAL-FUNCTION*, rule R1). Module 250 is also adapted to detect VIP events (cf. P over threshold at t4; humidity over/below threshold, electrical or thermal conductivity at particular values etc.). Based on a detected VIP event, module 250 sets the state value from FUNCTION* to FAILURE* (or from NORMAL-FUNCTION* to PRE-FAILURE-FUNCTION*, rule R2). Module 250 also determines T LIMIT as the time it takes from the VIP event to the object event (cf. the discussion in FIG. 5B, rule R3). T LIMIT can depend on the particular event. For example, T LIMIT in case of a single VIP event is larger than T LIMIT in case that multiple VIPs fail. For certain VIP events, T LIMIT can even be zero so that the state goes to FAILURE* immediately (rule R4). This can occur, for example, if all VIPs fail, or if θ OBJECT has reached θ MAX.

There are many ways to define rules. Recommender module 260 processes the state representations *, T LIMIT (and the actual time it takes to reach FAILURE*), the type of the event (single VIP event, multiple VIP event, pressure vs. conductivity, etc.) and applies recommendation rules (or instruction rules) to identify a recommendation (or an instruction). In the example of FIG. 4, the instruction was to interrupt the transportation and to replace a particular VIP.

Server 200 is communicatively coupled to a communication system that allows forwarding the recommendation/instruction 310 to handling agent 300, i.e. to the person who can physically interact with container 100 to perform the corrective action. The communication system can be system 202 (of FIG. 3) used in the opposite direction, or can be different system. Recommendation/instruction 310 can be presented to handling agent 300 on a user interface of computer 350 (e.g., as a message), such as on the user interface of a mobile device (that is not identical and not attached to container 100).

Handling agent 300 is a person in the vicinity of container 100 who could participate in the corrective action (e.g., the car driver in FIG. 4). Server 200 can identify how this person can be reached based on meta information.

It is however also possible to send instruction to container 100 (i.e., to unit 140) directly. A loudspeaker can send out a predefined acoustic message, (even in the language understood at a geographic location of the transport container), a buzzer could send an acoustic signal to alert the handling agent, a lamp could provide visual in indication of a critical state, a display unit could indicate instruction 301.

Operating the Container

FIG. 7 illustrates a flow-chart diagram of method 700 for operating transport container 100 (that is adapted to transport object 105).

In locating step 710, object 105 is located into object location 104 inside transport container 100. Object location 104 is thermally insulated by vacuum insulation panel 102-$i$, or VIP 102-$i$.

In a providing step 720, sensor unit 120-$i$ (that is assembled with VIP 102-$i$) provides panel condition signal (PCS) 125-$i$ that corresponds to measurement value Vij for at least one physical property of VIP 102-$i$. The physical property influences the temperature of the object θ OBJECT.

In a transmitting step 730, short-distance transmitter unit 130-$i$ transmits first coding 135-$i$ of PCS 125-$i$ inside transport container 100.

In a receiving step 740, long-distance transmitter unit 140 receives first coding 135-$i$ of PCS 125-$i$ from short-distance transmitter unit 130-$i$ and—in a transmitting step 750— periodically transmits second coding 145 of the panel condition signal PCS to remote server computer 200 for processing the panel condition signal to determine a state value of an operation state of transport container 100.

Method 700 optionally comprises determining a pre-failure state (of container 100), and as a consequence providing for corrective action 760 (e.g. to identify the corrective action). The action can be, for example, to replace the VIP 102-$i$, and/or to change the object temperature (θ OBJECT).

Method 700 can be a method that is at least partially a computer-implemented method. The step that can be implemented by computers are: providing (720, because a computer in the sensor unit can derive a PCS 125-$i$ from a signal that represents the physical property), transmitting (730, because computers can be used to control electronic devices that implement signal transmission), receiving (740, likewise because computer can be used to control electronic devices that implement signal reception), and—if executed—providing for corrective action (760, implemented by computers, such as the remote server computer). FIG. 7 also illustrates one or more computer programs (or computer program product(s)). The product—when loaded into a memory of a computer and being executed by at least one processor of the computer—performs at least some steps of method 700. It is noted that the steps that further process the PCS, by providing the first and second coding, and by transmitting the second coding, can be implemented by separate computers, in this case by micro-computers that could be implemented into the short-and-long distance transmitter units. In other words, blocks in FIG. 7 illustrate method 700 and also illustrate modules that can be implemented by the computer(s) under the control of the program.

Operating the Remote Server Computer

FIG. 8 illustrates a flow-chart diagram of computer-implemented method 800 for operating the remote server computer. As explained above, server 200 is adapted to receive second coding 145 of the PCS from container 100.

In a receiving step 810, server 200 receives a sample of second coding 145 (of the PCS). In a determining step 820, server 200 determines the state value of the operation state (S) of transport container 100 according to a set of re-defined rules (cf. R1, R2, R3, R4 in FIG. 6).

A first rule (R1) determines that the operation state of the transport container (100) is a normal function state (NORMAL-FUNCTION*). A second rule (R2) determines that the operation state of the container 100 is a pre-failure state (upon detecting the occurrence of an event in relation to the VIP, the VIP event). A third rule (R3) identifies a time interval from the VIP event until a predefined condition at object location 104 is reached (object event). The third rule also sets the representation of the state value to a failure state (FAILURE*) when the time interval (T LIMIT) has lapsed. In a storing step 830, server 200 stores representations (NORMAL-FUNCTION*, PRE-FAILURE-FUNCTION*, FAILURE*) of that state values.

FIG. 8 also illustrates a computer program or a computer program product. The computer program product—when loaded into a memory of a computer (here: server 200) and being executed by at least one processor of the computer—perform the steps of the computer-implemented method 800. In other words, the blocks in FIG. 8 illustrate method 800 and also illustrate modules that can be implemented by the computer under the control of the program.

VIPs with Different Materials

The description now looks at optional embodiments that distinguish the materials of the VIP.

FIG. 10 illustrates a flow-chart diagram of a method to explain the consequences of replacing VIPs with different materials. Method 1000 for operating a transport container 100 summarizes steps that occur at the transport container 100 itself, in the data communication channel between the VIP and server 200, and inside remote server 200.

First VIP 102-$i$ is replaced (step 1010) by second, new VIP (102'-$i$). Replacing 1010 the VIP 102-$i$ by a new VIP 102'-$i$ can occur for example as part of the corrective action. It is assumed that the first VIP has been manufactured by using a first material, and that the second VIP has been manufactured by using a second material, and that both materials cause the VIPs to have different thermal conductivity. As explained above, the first VIP and the second VIPs can be classified according to the materials into classes that represent the VIP performance due to the different thermal conductivity. The classes are represented by data structures that are associated with the VIPs. For example, there are data-structures that represent class #1 and class #2.

Since replacing means removing the first, old VIP and inserting the second, new VIP, the person of skill in the art can apply the teachings herein to situations in that transport containers are initially equipped with VIPs accordingly.

The material class is an input value for the operation of server 200. This is summarized as reading the class into server 200. Optionally, the material class (of the new VIP) is detected 1020 automatically (i.e. reading a data structure that represents the class), or an operator inputs the material class into server 200 manually (i.e., creating an entry to the data structure).

As a consequence, technical parameters that relate to the transmission of the second coding 145 of the PCS to the server 200 are being modified 1040. The technical parameters are, for example, the transmission interval T SAMPLE and the residual functioning interval T LIMIT. In case that the VIP performance increases (e.g. class #1 to #2), the intervals become longer (with a number of consequences such as to save energy to transmit the PCS, to reduce computation etc.)

Reading the data structures can comprise transmitting 1030 a material class signal (MCS) that indicates the material class of the second VIP to the server 200. The MCS that indicates the class of the new VIP can be detected by interaction between the new VIP and short-distance transmitter unit 130-$i$ (or, by interaction with long-distance transmitter unit 140). The MCS indicates the class of the new VIP to the server 200.

Method 1000 can be—at least partially—as computer-implemented method. The following steps can be computer-implemented: detecting (1020, computers can assist in reading codes from VIPs, or computers such as server 200 can receive the material class input from the operator), transmitting (1030, because computer can be part of the transmission electronics), modifying (1040, as being performed by server 200).

As a consequence, FIG. 10 also illustrates a computer program or a computer program product. The computer program product—when loaded into a memory of a computer and being executed by at least one processor of the computer—performs the computer-implemented steps 1020, 1030 and 1040. The blocks in the figure therefor also illustrate modules (cf. FIG. 8).

The description now explains further details for materials differentiation by looking back to some of the figures that had been explained already, but the focus is on the VIP material classification and its consequences.

Material Class Compatibility

As mentioned above, VIPs in different material classes can optionally co-exist. The selection of VIPs for assembly into a transport container depends on the VIP availability. The person (the operator) who assembles transport container 100 by inserting the VIP 102-$i$ can use VIPs of any material class. For example, for N=6 VIPs there could be VIPs in configuration #1 #1 #1 #2 #2 #2, in #1 #1 #1 #1 #1 #1 configuration or in other configurations. The availability of replacement VIPs can be different at various phases (cf. FIG. 4). For example, prior to placing the object into the container (cf. locating step 710 in FIG. 7, at initial phase 0 in FIG. 4), VIPs in class #2 are available (#2 #2 #2 #2 #2 #2 for N=6 VIPs); but at a later point in time (cf. phase 4 container repair by replacing a VIP), only class #1 VIPs are available (container in #2 #2 #2 #2 #2 #1 for N=6 VIPs and one VIP replaced).

Replacing a class #1 VIP by a class #2 VIP corresponds to an UPGRADE, replacing a class #2 VIP by a class #1 VIP corresponds to a DOWNGRADE.

There is a relation to the parameters, such as, for example, to the transmission parameter. To use the advantages of parameter differentiation, an UPGRADE should be accomplished by changing the parameters as well (e.g., longer T SAMPLE). An UPGRADE (e.g., #1 to #2) without changing the parameters (parameters at #1) does not use the advantages. On the other hand, a DOWNGRADE must be accomplished by a parameter change; otherwise a panel even can spoil the object (because T LIMIT etc. is calculated non-appropriately).

This complexity is even made more severe by looking at the following: At step 710/phase 0 (cf. FIG. 7), the operator might have access to remove server 200, but an operator in a subsequent phase might not. The description explains consequences as well as measures to reduce the handling complexity by referring to construction of the container (cf. FIG. 3), the usage scenario (cf. FIG. 4), to the method to operate the container (cf. FIG. 7) and to the method to operate the remote server (cf. FIG. 8).

Optionally, the material class (#1, #2 etc.) can be coded into the VIP and/or into the sensor, for example during manufacturing. The communication channel for the PCS (from sensor 120-i via transmitter unit 140 to remote server 200) can also transmit a material class signal (MCS). The MCS indicates the material class so that the remote server 200 is informed about the material class of a particular VIP. The information regarding the material class can be used by server 200 in applying the rules (such as rule R3).

For transmitting the MSC, there is no need to apply the mentioned time intervals (T CLOCK, T SAMPLE). In theory it is sufficient to transmit an indication of the material only once. In an alternative, the person who assembles the container can communicate the material class to server 200 manually.

Looking inside the container, transmitting step 730 can be accomplished with a different clock interval (T CLOCK longer for higher #), depending on the MCS. Receiving step 740 can be performed with longer T SAMPLE for higher material class #. In remote server 200, the rules can consider material classes: this relates, for example, to rule R3 (T LIMIT larger for higher classes) and relates, for example, to recommendations/instructions 310 (warning message in case of downgrade, or the like).

Considering Material Classes and Container Categories

It can be possible that server 200 communicates with two or more containers that have VIPs with different material. As explained, containers in material category #1 have different parameters than containers in material category #2. There would be a "heterogeneous fleet" of containers. Persons of skill in the art can modify server 200 (FIG. 6) with its modules and rules such that material categories are taken into account. The communication to/from the containers can optionally include data sets that represent the container category. Such modifications are also applicable to the methods, computer programs etc. explained in connection with FIGS. 7-8. For example, further steps can check the material classes (and/or the container category) and can differentiate between #1 and #2 for T SAMPLE, T LIMIT, for pre-defined corrective actions and so on. Instead of differentiating material classes for the VIPs, parameter differentiation according to container categories appears advantageous, for example, in view of the data complexity. Data structures for container categories and material classes are applied according to the same principles that have been explained, just at different granularity levels. For example, T SAMPLE and T LIMIT can be differentiated for containers in category #1 (at least some VIPs in material class #1) and category #2 (all VIPs in material class #2). Rules can be defined to be applied by the server 200, such as downgrading a VIP (replacement from class #2 to class #1) also downgrades the container (from category #2 to #1).

For corrective actions, default options can be defined for T SAMPLE and T LIMIT. In such case, a VIP replacement during transportation (e.g., FIG. 4 in a phase 1 or later) would automatically trigger the use of T SAMPLE and T LIMIT in the shorter duration (e.g., for #1). Such an approach would simplify the computation but would not take advantage of the mentioned advantages of the "long" intervals.

Further Options

Further embodiments are contemplated. For example, visualizing state information for the containers (including the VIPs) is possible on user interfaces are that receive data from remote server 200. The sender of the container can become a computer user who inspects visual representations of the VIPs in a fleet of containers, even if he or she does not see the containers in reality. In other words, a computer (that is connected to server 200) can represent the containers as "virtual twins".

Long-distance transmitter unit 140 can be implemented by a commercially available mobile device (e.g., a smartphone).

Regarding the VIP materials, using OAG (material class #2) instead of using PU/EPS (class #1) can be advantageous because the number of transport cycles (i.e., phases 0 to 4 in FIG. 4, or similar) is expected to be higher. In other words, containers with VIPs in higher material classes show ageing at a slower pace.

Regarding the determination of T LIMIT and other parameters, using the above-mentioned climate chamber is one option, but calibrating the technical parameters with historical data is possible as well. Since remote server 200 has received and accumulated the data over time, T LIMIT (and other parameters) can be fine-tuned. In other words, parameter adaptation by learning becomes possible.

To collect data, it is also possible to ship a so-called "dummy", a transport container with more sophisticated temperature measurement equipment, but without an object. Such a "dummy" could be transported as well. It is even possible to voluntarily destroy a VIPs during transport (of the "dummy") and to monitor the consequences (e.g. measure temperatures under real life conditions).

The data that is transmitted (from container 100 to remote server 200) is not necessarily the state, but is data that allows deriving the state. (A state allows determining a particular action, such as replacing a panel, but a mere indication would not.) The amount of data to be transmitted is larger as if just the state has to be transmitted. But this approach can be advantageous from the view point of energy consumption. As container 100 is being transported, a continuous supply of electrical energy (for transmitter 140, or for any gateway outside the container such as a WLAN-unit in a vehicle, cf. WLAN station 202-1a) is not always available. The approach with adaptive transmission intervals provides energy-saving so that the risk of running out of energy is being reduced.

Long-distance transmitter 140 (that receives the PCS in the first coding and transmits the PCS in the second coding) can be seen as a re-coder (from the first code to the second code) that provides the coding that is adequate in terms of minimized energy consumption. Calculating states consumes energy, but calculating the state is shifted to remote server 200 (where energy supply is not critical). Re-coding (by transmitter 140) does only address the differences in wireless standards, but also provides for an optimization of data amounts, and consequently also for an optimization of energy consumption. In other words, this increases the efficiency of data transmission. To further increase that efficiency, the sampling rate is adjusted.

The approach provides remote monitoring of the container (if possible continuous monitoring without interruption) by that the monitoring is adapted to the particular structural elements (i.e. VIPs) of the container. Remote monitoring can be in conflict with energy consumption so that—depending on the structural elements—monitoring is performed with parameters (such as transmission intervals) that are optimized for efficiency.

Further Aspects

The panel condition signal 125-$i$ can indicate one or more physical properties of the VIP 102-$i$. The properties influence the object temperature θ OBJECT, the physical properties can be selected from the group of: gas pressure (P(i)) inside the VIP, electrical conductivity of the VIP, thermal conductivity of the VIP, humidity of the VIP, temperature of the VIP, and vibration of the VIP. Based on the properties that are represented by the PCS, this PCS is a signal that is indicative of the condition of the VIP.

The short-distance transmitter unit 130-$i$ can be adapted to receive electrical energy from a source that selected from the group of: supercapacitor, radio network of the long-distance radio transmitter unit (140), vibration generator (the vibration energy being converted to electrical energy), battery, and a radio network in the surroundings of the container (harvesting energy). The short-distance transmitter unit 130-$i$ can be a radio transmitter based on signal transmission technology selected from the group of RFID, WLAN, BLUETOOTH.

At remote server computer 200, there is no need to differentiate first coding of the PCS from the second coding. Therefore, structure and operation of server computer 200 can be summarized by referring to a "coding". Consequently, a computer-implemented method for operating a server computer can be presented by referring to server computer 200 as being adapted to receive a coding 145 of panel condition signal 125-$i$ from transport container 100. Transport container 100 comprises vacuum insulation panels 120-$i$ that thermally insulate an object location 104. Panel condition signal 125-$i$ corresponds to measurement value Vij for at least one physical property (of VIP 102-$i$) that influences the temperature of an object at the object location 104. In receiving step 810, the computer receives a sample of the coding 145 (of the panel condition signal). In a determining step 820, the computer determines the state value of the operation state S of transport container 100 according to a set of pre-defined rules R1, R2, R3. As explained above, the first rule R1 determines that the operation state of transport container 100 is a normal function state (NORMAL-FUNCTION*), the second rule R2 determines that the operation state of transport container 100 is a pre-failure state, upon detecting the occurrence of an event in relation to the VIP (VIP event), the third rule R3 identifies a time interval from the VIP event until a predefined condition at the an object location 104 is reached (object event) and that sets the representation of the state value to a failure state (FAILURE*) when the time interval (TLIMIT) has lapsed. In a storing step 830, the computer stores representations (NORMAL-FUNCTION*, PRE-FAILURE-FUNCTION*, FAILURE*) of that state values. A computer-program product with code is applicable (cf. the explanations to FIGS. 7-8). Other rules can be applied, as explained above.

Generic Computer

Figure 9:
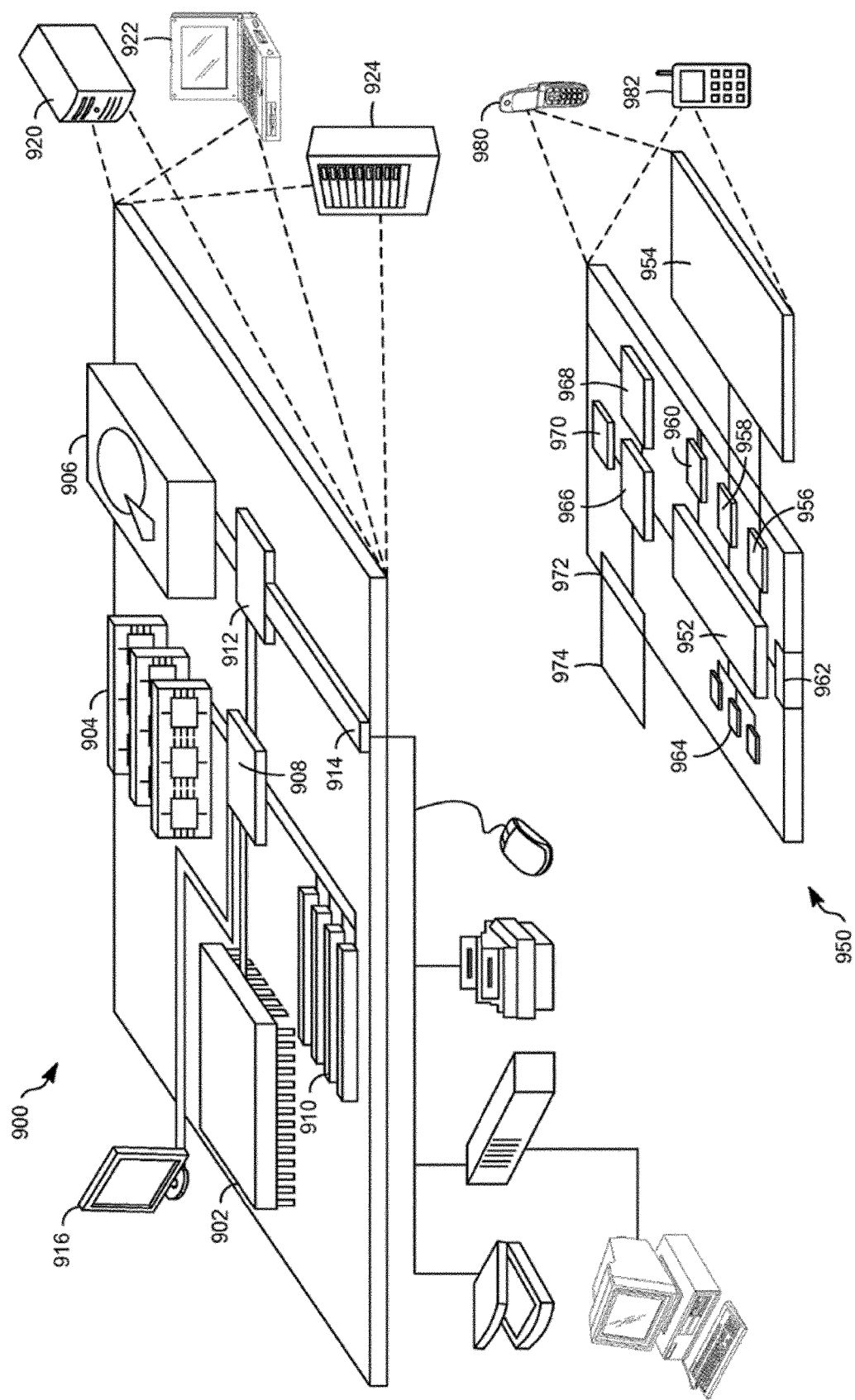
FIG. 9 illustrates an example of a generic computer device and a generic mobile computer device, which may be used with the techniques described here.

FIG. 9 illustrates an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device 900 may correspond to the long-distance transmitter unit 140 and/or to remote computer 200 of FIG. 1. Computing device 950 is intended to represent various forms of mobile devices, such as personal digital assistants, cellular telephones, smart phones, and other similar computing devices. For example, computing device 950 may include the data storage components and/or processing components of agent devices as shown in FIG. 1. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middle-ware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A transport container for transporting an object, the transport container comprising:
   an object location configured to receive the object;
   at least one vacuum insulation panel (VIP), configured to thermally insulate the object location;
   at least one sensor unit assembled with the VIP, the sensor unit configured to provide a panel condition signal that corresponds to a measurement value for at least one physical property of the VIP, wherein the physical property influences temperature of the object;
   at least one short-distance transmitter unit configured to transmit a first coding of the panel condition signal inside the transport container; and
   a long-distance transmitter unit configured to receive the first coding of the panel condition signal from the short-distance transmitter unit and to transmit a second coding of the panel condition signal to a remote server computer for processing the panel condition signal to determine a representation of an operation state of the transport container, wherein the operation state is related to the temperature of the object, and wherein depending on a transmission interval, being the time interval between subsequent transmissions of the second coding of the panel condition signal from the long-distance transmitter unit to the remote server computer, the transmission interval being dependent on a material used by the VIP, the transmission interval selected to be one of:
   a periodic transmission with the transmission interval having a predefined duration, or
   a non-period transmission with the transmission interval having a maximum duration.

2. The transport container according to claim 1, wherein the transmission interval is longer for a first VIP using a material with a higher thermal insulation performance than a second VIP using a material with a lower thermal insulation performance.

3. The transport container according to claim 2, wherein at least the transmission interval is differentiated by using a classification of the VIP material into material classes.

4. The transport container according to claim 3, wherein the VIP has core materials selected from the following: PU, EPS, and organic aerogel, wherein a first VIP with the organic aerogel material is classified into a relatively higher material performance class than a second VIP with the PU material or the EPS material.

5. The transport container according to claim 4, wherein the organic aerogel is an evacuate-enabled organic material.

6. The transport container according to claim 4, wherein the organic aerogel is a Wiegmann aerogel.

7. The transport container according to claim 1, wherein the transmission interval is selected such that monitoring the transport container is a real-time monitoring so that applying corrective actions to the transport container is possible.

8. A method for operating a transport container according to claim 1, the method comprising:
   replacing a first VIP that has been manufactured by using a first material with a second VIP that has been manufactured by using a second material, wherein both materials cause the VIPs to have different thermal conductivity; and
   modifying technical parameters relating to the transmission of the second coding of the panel condition signal to the remote server computer.

9. The method for operating a transport container according to claim 8,
   wherein the first VIP and the second VIPs are classified according to the materials into material performance classes that represent the VIP performance due to the different thermal conductivity, and wherein the material performance classes are represented by data structures that are associated with the VIPs;
   wherein the method further comprises:
   reading the data structures, and
   wherein, when the first VIP is classified to have a higher material performance class than the second VIP, the modifying the technical parameters comprises selecting a longer transmission interval for the first VIP than the second VIP.

10. The method for operating a transport container according to claim 8, wherein, when the first VIP is classified to have a higher material performance class than the second VIP, the modifying the technical parameters comprises selecting a longer residual functioning interval for the first VIP than the second VIP.

11. The method for operating a transport container according to claim 9, wherein the reading the data structures comprises transmitting a material class signal that indicates the class of the second VIP to the remote server computer.

12. A remote server computer configured to receive the second coding of a panel condition signal from a transport container comprising:
an object location configured to receive a object,
at least one vacuum insulation panel (VIP), configured to thermally insulate the object location,
at least one sensor unit assembled with the VIP, the sensor unit configured to provide a panel condition signal that corresponds to a measurement value for at least one physical property of the VIP, wherein the physical property influences temperature of the object,
at least one short-distance transmitter unit configured to transmit a first coding of the panel condition signal inside the transport container, and
a long-distance transmitter unit configured to receive the first coding of the panel condition signal from the short-distance transmitter unit and to transmit a second coding of the panel condition signal to a remote server computer for processing the panel condition signal to determine a representation of an operation state of the transport container, wherein the operation state is related to the temperature of the object, and wherein depending on a transmission interval, being the time interval between subsequent transmissions of the second coding of the panel condition signal from the long-distance transmitter unit to the remote server computer, the transmission interval is selected to be one of:
a periodic transmission with the transmission interval having a predefined duration, or
a non-period transmission with the transmission interval having a maximum duration,
the remote server computer comprising a rule module configured to:
receive the second coding of the panel condition signal in a sequence of samples,
determine a state value of the operation state of the transport container according to a set of predefined rules, upon receiving a new sample, and
store representations of that state values;
wherein the set of predefined rules comprises:
a first rule to determine that the operation state of the transport container is a normal function state,
a second rule to determine that the operation state of the transport container is a pre-failure state, upon detecting an occurrence of a VIP event in relation to the VIP, and
a third rule to identify a time interval from the VIP event until a predefined condition at the an object location is reached, hereinafter an object event and that sets the representation of the state value to a failure state when the time interval has lapsed, wherein the third rule identifies a time interval for a particular transport container depending on a material of the VIP.

13. The remote server computer according to claim 12, wherein the remote server computer receives a material class signal that indicates a class of a second VIP.

14. A method for operating a transport container configured to transport an object, the method comprising:
locating the object into an object location inside the transport container, wherein the object location is thermally insulated by a vacuum insulation panel (VIP);
by a sensor unit that is assembled with the VIP, providing a panel condition signal that corresponds to a measurement value for at least one physical property of the VIP, wherein the physical property influences temperature of the object;
by a short-distance transmitter unit, transmitting a first coding of the panel condition signal inside the transport container;
by a long-distance transmitter unit, receiving the first coding of the panel condition signal from the short-distance transmitter unit and transmitting a second coding of the panel condition signal to a remote server computer for processing the panel condition signal to determine a state value of an operation state of the transport container;
upon determining a pre-failure state of the transport container, providing for corrective action comprising an action selected from one of the following: replacing the VIP by a new VIP, and changing the object temperature; and
detecting a material class signal that indicates a material class of the new VIP by interaction between the new VIP and the short-distance transmitter unit, or by interaction between the new VIP and the long-distance transmitter unit.

15. The method according to claim 14, further comprising:
transmitting the material class signal that indicates the material class of the new VIP to the remote server computer.

16. The method according to claim 14, wherein:
the providing the panel condition signal, the transmitting the first coding of the panel condition signal, and the receiving the first coding of the panel condition signal are computer implemented.

17. A non-transitory computer program product, comprising instructions that when loaded into a memory of a computer and being executed by at least one processor of the computer cause the computer to participate in performing the method according to claim 16.

18. A computer-implemented method for operating a remote server computer, wherein the remote server computer is configured to receive a coding of a panel condition signal from a transport container that comprises a vacuum insulation panel (VIP) that thermally insulates an object location and wherein the panel condition signal corresponds to a measurement value for at least one physical property of the VIP that influences temperature of an object at the object location, the method comprising:
receiving a sample of the coding of the panel condition signal;
determining a state value of an operation state of the transport container according to a set of pre-defined rules,
with a first rule to determine that the operation state of the transport container is a normal function state,
with a second rule to determine that the operation state of the transport container is a pre-failure state, upon detecting an occurrence of a VIP event in relation to the VIP,
with a third rule to identify a time interval from the VIP event until a predefined condition at the object location is reached, and that sets a representation of the state value to a failure state when the time interval has lapsed; and
storing representations of that state values.

* * * * *